US012683962B2

(12) United States Patent
Madtha et al.

(10) Patent No.: US 12,683,962 B2
(45) Date of Patent: Jul. 14, 2026

(54) DEDICATED SECURE ENTRY POINTS FOR ACCESSING TARGET RESOURCES

(71) Applicant: Oracle International Corporation, Redwood Shores, CA (US)

(72) Inventors: Jivan Joseph Madtha, Saratoga, CA (US); Emily Lam, Irvine, CA (US); Payton Quinn, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 177 days.

(21) Appl. No.: 18/589,926

(22) Filed: Feb. 28, 2024

(65) Prior Publication Data

US 2025/0274453 A1      Aug. 28, 2025

(51) Int. Cl.
  *H04L 9/40*      (2022.01)
  *H04L 9/38*      (2006.01)
  *H04L 9/36*      (2006.01)

(52) U.S. Cl.
  CPC ............... *H04L 63/10* (2013.01); *H04L 9/38* (2013.01); *H04L 9/40* (2022.05); *H04L 9/36* (2013.01)

(58) Field of Classification Search
  CPC . H04L 63/10; H04L 63/1433; H04L 63/1425; H04L 9/40; H04L 9/36; H04L 9/38; H04L 9/28
  USPC .......................................... 709/220, 224–228
  See application file for complete search history.

(56) References Cited

U.S. PATENT DOCUMENTS 8,880,700 B2   11/2014  Ferris et al.
8,984,505 B2   3/2015   Ferris 9,398,014 B2 *  7/2016   Hewitt .................... H04L 67/52
9,800,584 B1 * 10/2017   Andruschuk ......... H04L 63/104
10,084,784 B1   9/2018   Brandwine et al.
10,511,584 B1 * 12/2019  Baer ..................... H04L 63/029
11,057,431 B2 *  7/2021   Goyal ..................... H04L 63/20
11,265,306 B2 *  3/2022   Yuan ................... H04L 41/0894
2010/0036955 A1   2/2010  Hopen et al.
2012/0117626 A1   5/2012  Yates et al.

(Continued)

FOREIGN PATENT DOCUMENTS

CN        110870278 A  *  3/2020   ........... G06F 21/604

OTHER PUBLICATIONS

"Bastion Overview", Sep. 5, 2023, pp. 7.

(Continued)

*Primary Examiner* — Khanh Q Dinh
(74) *Attorney, Agent, or Firm* — Invoke

(57)      ABSTRACT

A system identifies a secure entry point for accessing a target resource of a virtual cloud network. The system determines a mapping that maps the secure entry point to a particular addressable network entity of a plurality of addressable network entities. Based on the mapping, the system selects the particular addressable network entity as a destination for requests associated with the target resource. The system transmits a network address corresponding to the particular addressable network entity to a computing entity as a destination address for the requests associated with the target resource. The computing entity transmits the requests associated with the target resource to the network address corresponding to the particular addressable network entity, and the addressable network entity forwards the requests to the secure entry point.

20 Claims, 10 Drawing Sheets

(56) References Cited

U.S. PATENT DOCUMENTS

| | | | | |
|---|---|---|---|---|
| 2014/0298407 | A1* | 10/2014 | McClain | H04L 63/10 |
| | | | | 726/1 |
| 2016/0381022 | A1* | 12/2016 | Jackson | H04L 63/1441 |
| | | | | 726/7 |
| 2017/0104755 | A1* | 4/2017 | Arregoces | H04L 63/10 |
| 2019/0222577 | A1* | 7/2019 | Eliyahu | H04L 63/102 |
| 2020/0028838 | A1* | 1/2020 | Yuan | H04L 41/0803 |
| 2020/0186531 | A1 | 6/2020 | Bugenhagen | |
| 2021/0297411 | A1* | 9/2021 | Keselman | H04L 63/0807 |
| 2021/0342196 | A1 | 11/2021 | Natarajan et al. | |
| 2021/0385221 | A1* | 12/2021 | Nieman | H04L 41/0803 |
| 2022/0247790 | A1* | 8/2022 | Dhokia | H04L 63/1433 |
| 2022/0286462 | A1* | 9/2022 | Brannon | G06F 21/604 |
| 2022/0382583 | A1* | 12/2022 | Dumba | G06F 9/4881 |
| 2023/0058346 | A1* | 2/2023 | Osipov | H04L 63/102 |
| 2023/0344921 | A1* | 10/2023 | Duraisamy | H04L 63/0272 |
| 2023/0421376 | A1* | 12/2023 | Jain | H04L 63/10 |
| 2024/0056447 | A1* | 2/2024 | Bouchard | H04L 41/12 |
| 2024/0214356 | A1* | 6/2024 | Wang | H04L 63/10 |
| 2024/0333640 | A1* | 10/2024 | Shevade | H04L 45/44 |
| 2025/0138805 | A1* | 5/2025 | Copty | G06F 8/65 |

OTHER PUBLICATIONS

"Cisco ACI and Cisco Secure ADC Design Guide", Retrieved from https://www.cisco.com/c/en/us/solutions/collateral/data-center-virtualization/application-centric-infrastructure/aci-secure-adc-design-guide.html, Aug. 31, 2021, pp. 1-49.
"Cross-tenant management experiences", Retrieved from https://learn.microsoft.com/en-us/azure/lighthouse/concepts/cross-tenant-management-experience, Feb. 7, 2024, pp. 1-8.
"Gateway Load Balancer", Retrieved from https://aws.amazon.com/elasticloadbalancing/gateway-load-balancer/, Retrieved on Apr. 10, 2024, pp. 1-8.
Abdul et al., "Hierarchical Multi-tenancy in Business to Business Software Services", 44th Euromicro Conference on Software Engineering and Advanced Applications, 2018, pp. 494-501.
Stoian A., "OCI Bastion as a service", Oct. 30, 2021, pp. 5.

* cited by examiner

DEDICATED SECURE ENTRY POINTS FOR ACCESSING TARGET RESOURCES

TECHNICAL FIELD

The present disclosure relates to accessing target resources on a computing network such as a virtual cloud network. More particularly, the present disclosure relates to providing secure entry points that operators may utilize to access a target resource subject to satisfying applicable access conditions.

BACKGROUND

Cloud resources are provisioned in a secure environment of a computing network. To maintain the security of the cloud resources in the secure environment, external access to the cloud resources are restricted to a secure entry point. The secure entry point may represent a single, authorized pathway to access the cloud resources. Additionally, use of the secure entry point may be contingent upon satisfying a set of access conditions.

In one example, a cloud provider may provide cloud infrastructure services to a tenant. The cloud infrastructure services are provisioned within a tenant compartment that is secured from unauthorized access. The tenant, in turn, may provide cloud resources to customers. The cloud resources are provided to a particular customer within a segment of the tenant compartment that is allocated for the particular customer. As examples, the cloud resources that a tenant may provide to a customer include virtual machines, databases, storage services, applications, or content delivery. The customer may utilize a secure entry point and/or access conditions to maintain the security of the cloud resources. In one example, the cloud resources are accessed by users associated with the customer. Additionally, or alternatively, the customer may authorize a cloud operator to access the cloud resources, for example, to provide technical support services to the customer on behalf of the cloud provider and/or the tenant. The user or cloud operator may utilize the secure entry point to access the cloud resources subject to satisfying the set of access conditions.

The content of this background section should not be construed as prior art merely by virtue of its presence in this section.

BRIEF DESCRIPTION OF THE DRAWINGS

The embodiments are illustrated by way of example and not by way of limitation in the figures of the accompanying drawings. References to "an" or "one" embodiment in this disclosure are not necessarily to the same embodiment, and they mean at least one. In the drawings.

DETAILED DESCRIPTION

Figure 1:
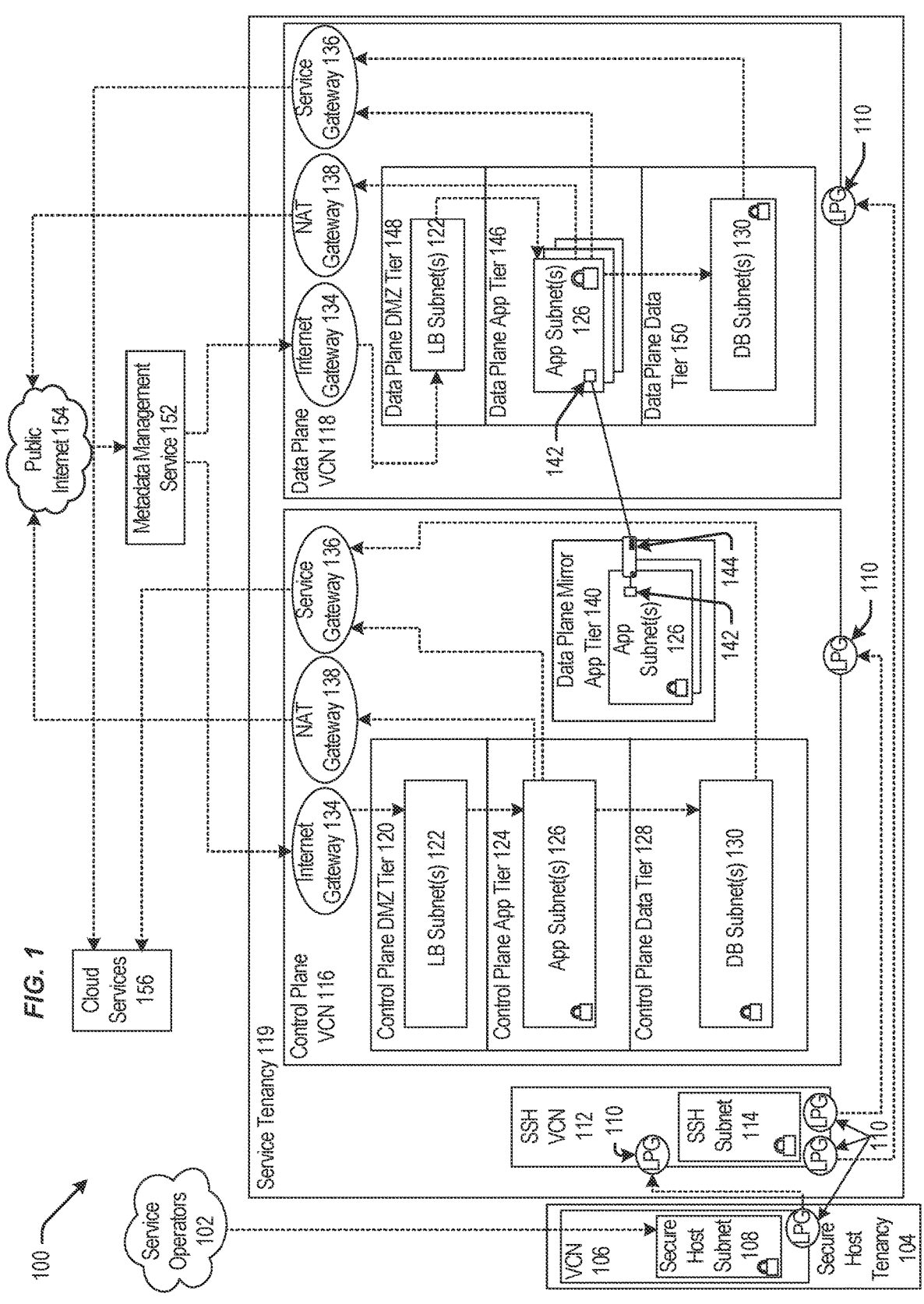
FIGS. 1-4 are block diagrams illustrating patterns for implementing a cloud infrastructure as a service system in accordance with one or more embodiments.

In the following description, for the purposes of explanation, numerous specific details are set forth to provide a thorough understanding. One or more embodiments are practiced without these specific details. Features described in one embodiment may be combined with features described in a different embodiment. In some examples, well-known structures and devices are described with reference to a block diagram form to avoid unnecessarily obscuring the present disclosure.

1. GENERAL OVERVIEW
2. DEFINITIONS
3. CLOUD COMPUTING TECHNOLOGY
4. COMPUTER SYSTEM
5. ARCHITECTURAL OVERVIEW
6. EXAMPLE OPERATIONS
7. MISCELLANEOUS; EXTENSIONS

1. GENERAL OVERVIEW

A system includes a set of dedicated secure entry points for accessing particular sets of target resources of a virtual cloud network. The dedicated secure entry points are accessible by addressable network entities that are respectively mapped to a corresponding dedicated secure entry point. For a dedicated secure entry point, the system selects a particular addressable network entity based on the mapping of the particular network entity to the dedicated secure entry point. For a computing entity to access a target resource via a dedicated secure entry point, the system transmits to the computing entity a network address corresponding to the addressable network entity, that is mapped to the dedicated secure entry point corresponding to the target resource, as a destination address for accessing the target resource. The computing entity, having received the network address, transmits a request to access the target resource to the addressable network address, and the addressable network entity forwards the request to the dedicated secure entry point to establish a secure connection with the target resource via the dedicated secure entry point.

In one example, the system includes a network gateway with a set of logical gateway hosts that respectively serve as a dedicated secure entry point for accessing a particular set of target resources of a virtual cloud network that are respectively subject to a particular set of access conditions. The logical gateway hosts are not directly reachable by computing entities that users, such as cloud operators, might utilize to access target resources. For example, as logical resources, the logical gateway hosts may lack a static network address. Instead, a network load balancer that is addressable by computing entities utilized by such users or cloud operators is provisioned and mapped to a logical gateway host that serves as the dedicated secure entry point for accessing the target resource. A user or cloud operator is provided a network address of the network load balancer that serves as a destination address for accessing the target resource. The network load balancer receives, from a computing entity associated with the user or cloud operator, an access request addressed to the network address corresponding to the network load balancer.

In one example, the network load balancer may be associated with a set of restricted access criteria. Access to a target resource via a corresponding network load balancer may be conditioned upon satisfying the set of restricted access criteria. A particular set of restricted access criteria may be associated with a corresponding target resource. For example, various security levels are applicable to different target resources. Additionally, or alternatively, a particular set of restricted access criteria may be associated with a set of users that may access a target resource. For example, various security levels are applicable to different sets of users. Access requests to access target resources are validated against the particular set of restricted access criteria corresponding to the target resource and/or the user associated with the access request. Additionally, or alternatively, access requests to access target resources are validated based on the mapping of the dedicated secure entry point to the addressable network entity, for example, to confirm that access requests are sent to the correct destination address corresponding to the dedicated secure entry point for the particular target resource.

The system provisions target resources for secure access by computing entities located externally to the virtual cloud network. To provision a target resource for secure access, the system may instantiate a logical gateway host as a dedicated secure entry point for accessing the target resource. Additionally, the system may select a network load balancer as a restricted access point for accessing the logical gateway host. Additionally, or alternatively, the system may select the logical gateway host from a set of previously instantiated logical gateway hosts, and/or the system may select the network load balancer from a set of previously instantiated logical network load balancers. Subsequent to provisioning the target resource for secure access, the system may transit a network address corresponding to the network load balancer to a computing entity, and the computing entity may utilize the network address to access the target resource upon satisfying the access conditions associated with the network load balancer.

When provisioning a target resource for secure access, the system determines whether a set of one or more restricted access criteria associated with the target resource matches the access conditions associated with a network load balancer that has already been instantiated. If the restricted access criteria matches the access conditions associated with a network load balancer that has already been instantiated, the network load balancer is selected as a restricted access point for accessing a logical gateway host associated with the target resource. If the restricted access criteria does not match the access conditions of a network load balancer that has already been instantiated, an additional network load balancer is instantiated. Additionally, or alternatively, the system either selects a logical gateway host that has already been instantiated, or the system provisions an additional logical gateway host. In one example, a separate logical gateway host is provisioned for target resources associated with a particular customer that utilizes cloud services made available on the virtual cloud network by a cloud provider. Additionally, or alternatively, a logical gateway host is utilized for different target resources associated with the same customer. In one example, the different target resources are associated with different services that the customer receives from different tenants of the cloud provider.

The system may validate the access request against a set of one or more access conditions associated with the target resource. Additionally, the system determines, based on an association between the network load balancer and the logical gateway host, that the logical gateway host is the dedicated secure entry point for accessing the target resource. Responsive to determining that the logical gateway host is the dedicated secure entry point for accessing the target resource, the system may establish a secure connection between the computing entity and the target resource that passes through the network load balancer and the logical gateway host. Upon the system having established the secure connection, the computing entity may utilize the secure connection to access the target resource.

In one example, the target resource may be located on a cloud infrastructure provided by the cloud operator. A tenant of the cloud operator may host the target resource on the cloud infrastructure. A customer of the tenant may own the target resource. The cloud operator may be pre-authorized, for example, by the customer, to access the target resource subject to satisfying a set of one or more access conditions. The set of one or more access conditions may be specified by a particular customer, for example, based on the customer's particular security requirements. Additionally, or alternatively, the set of one or more access conditions may be specified for a particular target resource, for example, based on particular security requirements associated with the target resource. In one example, the system may authorize access to target resources associated with different customers based on access conditions that differ between respective customers. Additionally, or alternatively, the system may authorize access to target resources based on access conditions that differ between respective target resources.

The system includes a provisioning service that provisions various logical gateway hosts and corresponding network load balancers, for example, contemporaneously with provisioning a target resource on the virtual cloud network. In one example, the provisioning service provisions a network load balancer that includes a particular set of access conditions associated with a target resource when the particular set of access conditions is not already provided by another network load balancer in the network gateway. Additionally, or alternatively, the provisioning service determines that a first set of access conditions associated with a first target resource matches an existing set of access conditions associated with a first network load balancer that is already provisioned in the network gateway. Responsive to determining that the first set of access conditions matches the existing set of access conditions, the provisioning service may associate the first target resource with the first network load balancer. In one example, multiple logical gateway hosts that respectively serve as a dedicated secure entry point for a particular target resource may be associated with a particular network load balancer that is associated with a particular set of access conditions. Additionally, or alternatively, different logical gateway hosts may be associated with different network load balancer.

When provisioning a target resource, the provisioning service may receive a customer ID that identifies the customer associated with the target resource. The provisioning service may identify one or more tenant compartments that include one or more target resources associated with the customer ID. For a target resource identified based on the customer ID, the provisioning service may identify the corresponding network load balancer based on network address mapping between the network load balancer and the customer ID. The provisioning service may compare the access conditions required for the target resource that is being provisioned to the access conditions for an identified network load balancer to determine whether one of the network load balancers that is already associated with the customer includes access conditions that match the access conditions required for the target resource that is being provisioned. In one example, a customer may receive services from multiple tenants in different tenant compartments. If a customer has multiple sets of target resources associated with different tenants that have the same access conditions, the tenants may share a network load balancer for the multiple sets of target resources.

In one example, the set of one or more access conditions include a set of source network addresses associated with a fleet of cloud operator devices. The system may be configured to limit authorization of incoming traffic to traffic originating from the set of source network addresses associated with the fleet of cloud operator devices. Additionally, or alternatively, the access conditions include a geolocation restriction and/or a media access control (MAC) address restriction. The system may be configured to authorize incoming traffic only from one or more particular geolocations and/or from one or more particular MAC addresses. Additionally, or alternatively, access may be limited to one or more particular user accounts that have been granted permission to access a target resource. In one example, the set of one or more access conditions are implemented by a set of one or more access filters. The set of one or more access filters may be implemented in the corresponding network load balancer and/or in an edge server associated with the network gateway.

One or more embodiments described in this Specification and/or recited in the claims may not be included in this General Overview section.

2. DEFINITIONS

As used herein, the term "compartment" refers to a set of one or more containers utilized to organize and segregate resources, services, and/or permissions of a cloud computing environment.

As used herein, the term "container" refers to a virtual structure used to organize and manage cloud resources, services, or data.

As used herein, the term "target resource" refers to a resource on a computing network that may be accessed by one or more computing entities. A computing entity that accesses a target resource may be located externally to the computing network. As examples, a target resource may include one or more of the following: a computing entity, a virtual machine, a database, a service, a data storage resource, a container, a compartment, or a networking resource.

As used herein, the term "tenant" refers to an entity that receives cloud computing services provided by a cloud provider.

As used herein, the term "cloud provider" or "service provider" refers to a provider of cloud computing services, such as an Infrastructure as a Service (IaaS) and/or one or more target services located on a cloud provider infrastructure.

As used herein, the term "cloud operator" refers to an entity that maintains cloud infrastructure. A cloud operator may perform services on behalf of a cloud provider, such as provisioning, configuring, troubleshooting, debugging, maintaining, or managing cloud resources and related infrastructure. A cloud operator and a cloud provider may be different entities or the same entity.

As used herein, the term "customer" may refer to a tenant or an entity that receives services from a tenant.

As used herein, the term "on-premises network" refers to a network infrastructure or device that is located and operated within a physical premises or data center of a tenant.

As used herein, the term "multi-cloud environment" refers to a cloud computing strategy that integrates services and resources from multiple cloud providers. In a multi-cloud environment, an organization may simultaneously utilize the infrastructure, platform, or software services of two or more cloud providers rather than relying on a single cloud provider. Additionally, or alternatively, in a multi-cloud environment, a first cloud provider may be a customer or a client with respect to a second cloud provider.

As used herein, the term "computing entity" refers to a device, component, or element of a computing device. A computing entity may be located within or externally to a computing network and/or cloud infrastructure. A computing entity may be implemented in hardware and/or software.

3. CLOUD COMPUTING TECHNOLOGY

Infrastructure as a Service (IaaS) is an application of cloud computing technology. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components; example services include billing software, monitoring software, logging software, load balancing software, clustering software, etc. Thus, as these services are policy-driven, IaaS users are able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and install enterprise software into that VM. Customers can then use the provider's services to perform various functions, including balancing network traffic, troubleshooting application issues, monitoring performance, and managing disaster recovery, etc.

In some cases, a cloud computing model will involve the participation of a cloud provider. The cloud provider may, but need not, be a third-party service that specializes in providing (e.g., offering, renting, selling) IaaS. An entity may also opt to deploy a private cloud, becoming its own provider of infrastructure services.

In some examples, IaaS deployment is the process of implementing a new application, or a new version of an application, onto a prepared application server or other similar device. IaaS deployment may also include the process of preparing the server (e.g., installing libraries, daemons, etc.). The deployment process is often managed by the cloud provider below the hypervisor layer (e.g., the servers, storage, network hardware, and virtualization). Thus, the customer may be responsible for handling (OS), middleware, and/or application deployment, such as on self-service virtual machines. The self-service virtual machines can be spun up on demand.

In some examples, IaaS provisioning may refer to acquiring computers or virtual hosts for use, even installing needed libraries or services on them. In most cases, deployment does not include provisioning, and the provisioning may need to be performed first.

In some cases, there are challenges for IaaS provisioning. There is an initial challenge of provisioning the initial set of infrastructure. There is an additional challenge of evolving the existing infrastructure (e.g., adding new services, changing services, removing services, etc.) after the initial provisioning is completed. In some cases, these challenges are addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on one another, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up for one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques are employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). In some embodiments, infrastructure and resources are provisioned (manually, and/or using a provisioning tool) prior to deployment of code to be executed on the infrastructure. However, in some examples, the infrastructure that will deploy the code may first be set up. In some instances, the provisioning can be done manually, a provisioning tool is utilized to provision the resources, and/or deployment tools are utilized to deploy the code once the infrastructure is provisioned.

FIG. 1 is a block diagram illustrating an example pattern of an IaaS architecture 100 according to at least one embodiment. Service operators 102 can be communicatively coupled to a secure host tenancy 104 that can include a virtual cloud network (VCN) 106 and a secure host subnet 108. In some examples, the service operators 102 may be using one or more client computing devices, such as portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers, including personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems such as Google Chrome OS. Additionally, or alternatively, client computing devices are any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 106 and/or the Internet.

The VCN 106 can include a local peering gateway (LPG) 110 that can be communicatively coupled to a secure shell (SSH) VCN 112 via an LPG 110 contained in the SSH VCN 112. The SSH VCN 112 can include an SSH subnet 114, and the SSH VCN 112 can be communicatively coupled to a control plane VCN 116 via the LPG 110 contained in the control plane VCN 116. Also, the SSH VCN 112 can be communicatively coupled to a data plane VCN 118 via an LPG 110. The control plane VCN 116 and the data plane VCN 118 can be contained in a service tenancy 119 that can be owned and/or operated by the IaaS provider.

The control plane VCN 116 can include a control plane demilitarized zone (DMZ) tier 120 that acts as a perimeter network (e.g., portions of a corporate network between the corporate intranet and external networks). The DMZ-based servers may have restricted responsibilities and help keep breaches contained. Additionally, the DMZ tier 120 can include one or more load balancer (LB) subnet(s) 122, a control plane app tier 124 that can include app subnet(s) 126, a control plane data tier 128 that can include database (DB) subnet(s) 130 (e.g., frontend DB subnet(s) and/or backend DB subnet(s)). The LB subnet(s) 122 contained in the control plane DMZ tier 120 can be communicatively coupled to the app subnet(s) 126 contained in the control plane app tier 124 and an Internet gateway 134 that can be contained in the control plane VCN 116. The app subnet(s) 126 can be communicatively coupled to the DB subnet(s) 130 contained in the control plane data tier 128 and a service gateway 136 and a network address translation (NAT) gateway 138. The control plane VCN 116 can include the service gateway 136 and the NAT gateway 138.

The control plane VCN 116 can include a data plane mirror app tier 140 that can include app subnet(s) 126. The app subnet(s) 126 contained in the data plane mirror app tier 140 can include a virtual network interface controller (VNIC) 142 that can execute a compute instance 144. The compute instance 144 can communicatively couple the app subnet(s) 126 of the data plane mirror app tier 140 to app subnet(s) 126 that can be contained in a data plane app tier 146.

The data plane VCN 118 can include the data plane app tier 146, a data plane DMZ tier 148, and a data plane data tier 150. The data plane DMZ tier 148 can include LB subnet(s) 122 that can be communicatively coupled to the app subnet(s) 126 of the data plane app tier 146 and the Internet gateway 134 of the data plane VCN 118. The app subnet(s) 126 can be communicatively coupled to the service gateway 136 of the data plane VCN 118 and the NAT gateway 138 of the data plane VCN 118. The data plane data tier 150 can also include the DB subnet(s) 130 that can be communicatively coupled to the app subnet(s) 126 of the data plane app tier 146.

The Internet gateway 134 of the control plane VCN 116 and of the data plane VCN 118 can be communicatively coupled to a metadata management service 152 that can be communicatively coupled to public Internet 154. Public Internet 154 can be communicatively coupled to the NAT gateway 138 of the control plane VCN 116 and of the data plane VCN 118. The service gateway 136 of the control plane VCN 116 and of the data plane VCN 118 can be communicatively couple to cloud services 156.

In some examples, the service gateway 136 of the control plane VCN 116 or of the data plane VCN 118 can make application programming interface (API) calls to cloud services 156 without going through public Internet 154. The API calls to cloud services 156 from the service gateway 136 can be one-way; the service gateway 136 can make API calls to cloud services 156, and cloud services 156 can send requested data to the service gateway 136. However, cloud services 156 may not initiate API calls to the service gateway 136.

In some examples, the secure host tenancy 104 can be directly connected to the service tenancy 119. The service tenancy 119 may otherwise be isolated. The secure host subnet 108 can communicate with the SSH subnet 114 through an LPG 110 that may enable two-way communication over an otherwise isolated system. Connecting the secure host subnet 108 to the SSH subnet 114 may give the secure host subnet 108 access to other entities within the service tenancy 119.

The control plane VCN 116 may allow users of the service tenancy 119 to set up or otherwise provision desired resources. Desired resources provisioned in the control plane VCN 116 may be deployed or otherwise used in the data plane VCN 118. In some examples, the control plane VCN 116 can be isolated from the data plane VCN 118, and the data plane mirror app tier 140 of the control plane VCN 116 can communicate with the data plane app tier 146 of the data plane VCN 118 via VNICs 142 that can be contained in the data plane mirror app tier 140 and the data plane app tier 146.

In some examples, users of the system, or customers, can make requests, for example create, read, update, or delete (CRUD) operations, through public Internet 154 that can communicate the requests to the metadata management service 152. The metadata management service 152 can communicate the request to the control plane VCN 116 through the Internet gateway 134. The request can be received by the LB subnet(s) 122 contained in the control plane DMZ tier 120. The LB subnet(s) 122 determines that the request is valid, and in response, the LB subnet(s) 122 can transmit the request to app subnet(s) 126 contained in the control plane app tier 124. If the request is validated and requires a call to public Internet 154, the call to public Internet 154 may be transmitted to the NAT gateway 138 that can make the call to public Internet 154. Metadata that may be desired to be stored by the request can be stored in the DB subnet(s) 130.

In some examples, the data plane mirror app tier 140 can facilitate direct communication between the control plane VCN 116 and the data plane VCN 118. For example, changes, updates, or other suitable modifications to configuration may be desired to be applied to the resources contained in the data plane VCN 118. Via a VNIC 142, the control plane VCN 116 can directly communicate with, and can thereby execute the changes, updates, or other suitable modifications to configuration to, resources contained in the data plane VCN 118.

In some embodiments, the control plane VCN 116 and the data plane VCN 118 can be contained in the service tenancy 119. In this case, the user, or the customer, of the system may not own or operate either the control plane VCN 116 or the data plane VCN 118. Instead, the IaaS provider may own or operate the control plane VCN 116 and the data plane VCN 118. The control plane VCN 116 and the data plane VCN 118 may be contained in the service tenancy 119. This embodiment can enable isolation of networks that may prevent users or customers from interacting with other users', or other customers', resources. Also, this embodiment may allow users or customers of the system to store databases privately without needing to rely on public Internet 154 for storage.

In other embodiments, the LB subnet(s) 122 contained in the control plane VCN 116 can be configured to receive a signal from the service gateway 136. In this embodiment, the control plane VCN 116 and the data plane VCN 118 may be configured to be called by a customer of the IaaS provider without calling public Internet 154. Customers of the IaaS provider may desire this embodiment since database(s) that the customers use may be controlled by the IaaS provider and may be stored on the service tenancy 119. The service tenancy 119 may be isolated from public Internet 154.

Figure 2:
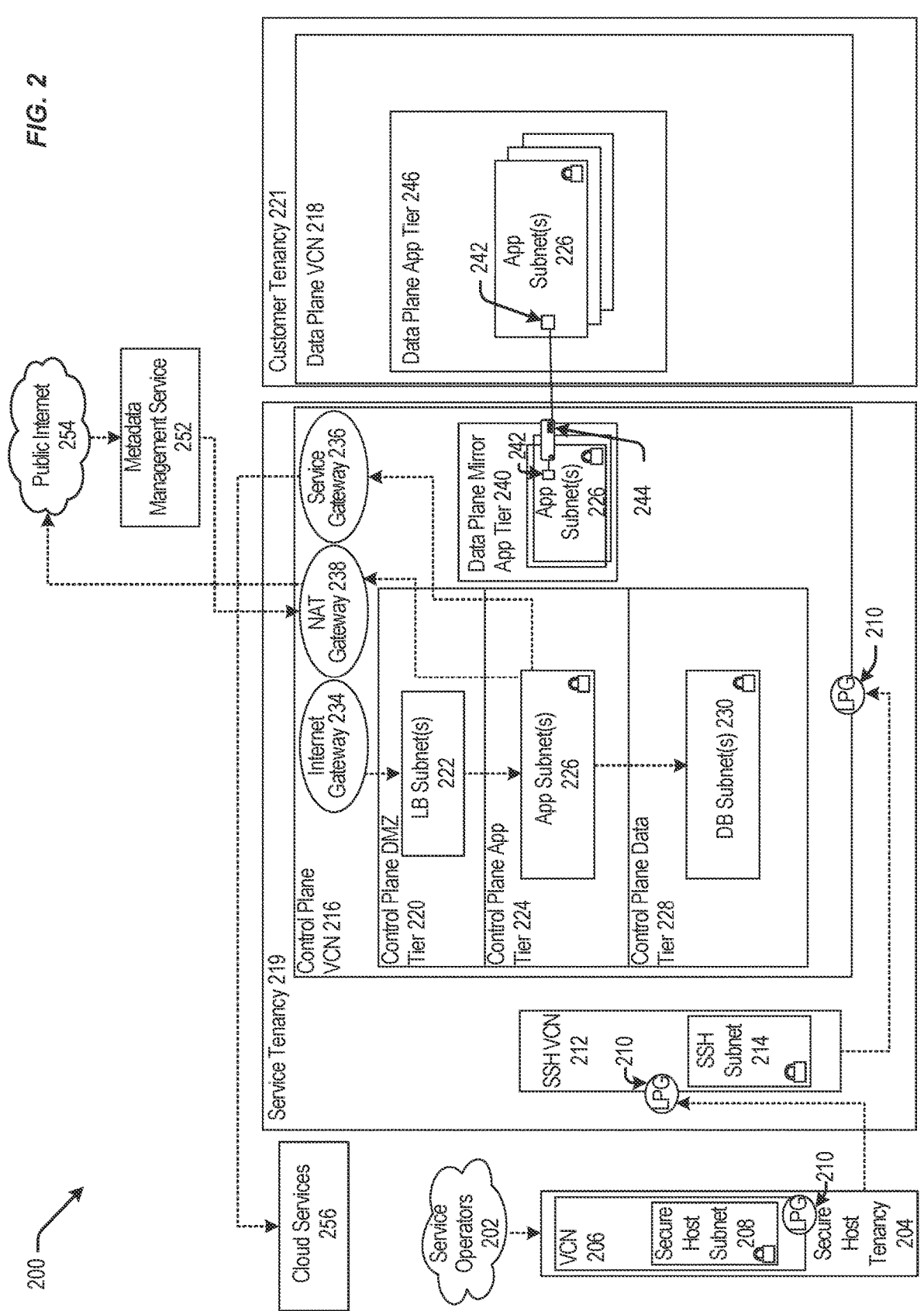

FIG. 2 is a block diagram illustrating another example pattern of an IaaS architecture 200 according to at least one embodiment. Service operators 202 (e.g., service operators 102 of FIG. 1) can be communicatively coupled to a secure host tenancy 204 (e.g., the secure host tenancy 104 of FIG. 1) that can include a virtual cloud network (VCN) 206 (e.g., the VCN 106 of FIG. 1) and a secure host subnet 208 (e.g., the secure host subnet 108 of FIG. 1). The VCN 206 can include a local peering gateway (LPG) 210 (e.g., the LPG 110 of FIG. 1) that can be communicatively coupled to a secure shell (SSH) VCN 212 (e.g., the SSH VCN 112 of FIG. 1) via an LPG 110 contained in the SSH VCN 212. The SSH VCN 212 can include an SSH subnet 214 (e.g., the SSH subnet 114 of FIG. 1), and the SSH VCN 212 can be communicatively coupled to a control plane VCN 216 (e.g., the control plane VCN 116 of FIG. 1) via an LPG 210 contained in the control plane VCN 216. The control plane VCN 216 can be contained in a service tenancy 219 (e.g., the service tenancy 119 of FIG. 1), and the data plane VCN 218 (e.g., the data plane VCN 118 of FIG. 1) can be contained in a customer tenancy 221 that may be owned or operated by users, or customers, of the system.

The control plane VCN 216 can include a control plane DMZ tier 220 (e.g., the control plane DMZ tier 120 of FIG. 1) that can include LB subnet(s) 222 (e.g., LB subnet(s) 122 of FIG. 1), a control plane app tier 224 (e.g., the control plane app tier 124 of FIG. 1) that can include app subnet(s) 226 (e.g., app subnet(s) 126 of FIG. 1), and a control plane data tier 228 (e.g., the control plane data tier 128 of FIG. 1) that can include database (DB) subnet(s) 230 (e.g., similar to DB subnet(s) 130 of FIG. 1). The LB subnet(s) 222 contained in the control plane DMZ tier 220 can be communicatively coupled to the app subnet(s) 226 contained in the control plane app tier 224 and an Internet gateway 234 (e.g., the Internet gateway 134 of FIG. 1) that can be contained in the control plane VCN 216. The app subnet(s) 226 can be communicatively coupled to the DB subnet(s) 230 contained in the control plane data tier 228 and a service gateway 236 (e.g., the service gateway 136 of FIG. 1) and a network address translation (NAT) gateway 238 (e.g., the NAT gateway 138 of FIG. 1). The control plane VCN 216 can include the service gateway 236 and the NAT gateway 238.

The control plane VCN 216 can include a data plane mirror app tier 240 (e.g., the data plane mirror app tier 140 of FIG. 1) that can include app subnet(s) 226. The app subnet(s) 226 contained in the data plane mirror app tier 240 can include a virtual network interface controller (VNIC) 242 (e.g., the VNIC of 142) that can execute a compute instance 244 (e.g., similar to the compute instance 144 of FIG. 1). The compute instance 244 can facilitate communication between the app subnet(s) 226 of the data plane mirror app tier 240 and the app subnet(s) 226 that can be contained in a data plane app tier 246 (e.g., the data plane app tier 146 of FIG. 1) via the VNIC 242 contained in the data plane mirror app tier 240 and the VNIC 242 contained in the data plane app tier 246.

The Internet gateway 234 contained in the control plane VCN 216 can be communicatively coupled to a metadata management service 252 (e.g., the metadata management service 152 of FIG. 1) that can be communicatively coupled to public Internet 254 (e.g., public Internet 154 of FIG. 1). Public Internet 254 can be communicatively coupled to the NAT gateway 238 contained in the control plane VCN 216. The service gateway 236 contained in the control plane VCN 216 can be communicatively couple to cloud services 256 (e.g., cloud services 156 of FIG. 1).

In some examples, the data plane VCN 218 can be contained in the customer tenancy 221. In this case, the IaaS provider may provide the control plane VCN 216 for each customer, and the IaaS provider may, for each customer, set up a unique, compute instance 244 that is contained in the service tenancy 219. Each compute instance 244 may allow communication between the control plane VCN 216 contained in the service tenancy 219 and the data plane VCN 218 that is contained in the customer tenancy 221. The compute instance 244 may allow resources provisioned in the control plane VCN 216 that is contained in the service tenancy 219 to be deployed or otherwise used in the data plane VCN 218 that is contained in the customer tenancy 221.

In other examples, the customer of the IaaS provider may have databases that live in the customer tenancy 221. In this example, the control plane VCN 216 can include the data plane mirror app tier 240 that can include app subnet(s) 226. The data plane mirror app tier 240 can reside in the data plane VCN 218, but the data plane mirror app tier 240 may not live in the data plane VCN 218. That is, the data plane mirror app tier 240 may have access to the customer tenancy 221, but the data plane mirror app tier 240 may not exist in the data plane VCN 218 or be owned or operated by the customer of the IaaS provider. The data plane mirror app tier 240 may be configured to make calls to the data plane VCN 218 but may not be configured to make calls to any entity contained in the control plane VCN 216. The customer may desire to deploy or otherwise use resources in the data plane VCN 218 that are provisioned in the control plane VCN 216, and the data plane mirror app tier 240 can facilitate the desired deployment or other usage of resources of the customer.

In some embodiments, the customer of the IaaS provider can apply filters to the data plane VCN 218. In this embodiment, the customer can determine what the data plane VCN 218 can access, and the customer may restrict access to public Internet 254 from the data plane VCN 218. The IaaS provider may not be able to apply filters or otherwise control access of the data plane VCN 218 to any outside networks or databases. Applying filters and controls by the customer onto the data plane VCN 218, contained in the customer tenancy 221, can help isolate the data plane VCN 218 from other customers and from public Internet 254.

In some embodiments, cloud services 256 can be called by the service gateway 236 to access services that may not exist on public Internet 254, on the control plane VCN 216, or on the data plane VCN 218. The connection between cloud services 256 and the control plane VCN 216 or the data plane VCN 218 may not be live or continuous. Cloud services 256 may exist on a different network owned or operated by the IaaS provider. Cloud services 256 may be configured to receive calls from the service gateway 236 and may be configured to not receive calls from public Internet

254. Some cloud services 256 may be isolated from other cloud services 256, and the control plane VCN 216 may be isolated from cloud services 256 that may not be in the same region as the control plane VCN 216. For example, the control plane VCN 216 may be located in "Region 1," and cloud service "Deployment 1" may be located in Region 1 and in "Region 2." If a call to Deployment 1 is made by the service gateway 236 contained in the control plane VCN 216 located in Region 1, the call may be transmitted to Deployment 1 in Region 1. In this example, the control plane VCN 216, or Deployment 1 in Region 1, may not be communicatively coupled to, or otherwise in communication with, Deployment 1 in Region 2.

Figure 3:
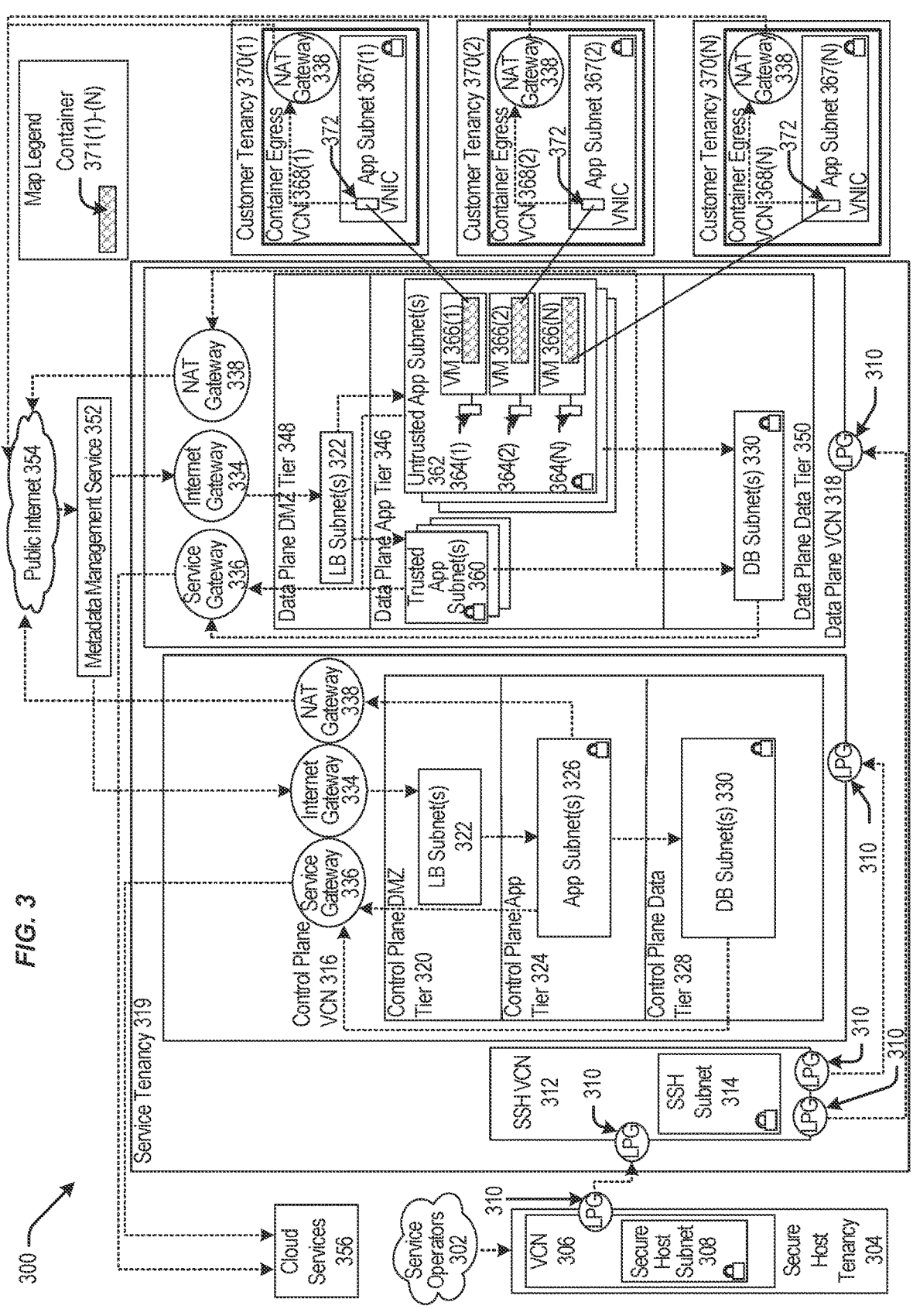

FIG. 3 is a block diagram illustrating another example pattern of an IaaS architecture 300 according to at least one embodiment. Service operators 302 (e.g., service operators 102 of FIG. 1) can be communicatively coupled to a secure host tenancy 304 (e.g., the secure host tenancy 104 of FIG. 1) that can include a virtual cloud network (VCN) 306 (e.g., the VCN 106 of FIG. 1) and a secure host subnet 308 (e.g., the secure host subnet 108 of FIG. 1). The VCN 306 can include an LPG 310 (e.g., the LPG 110 of FIG. 1) that can be communicatively coupled to an SSH VCN 312 (e.g., the SSH VCN 112 of FIG. 1) via an LPG 310 contained in the SSH VCN 312. The SSH VCN 312 can include an SSH subnet 314 (e.g., the SSH subnet 114 of FIG. 1), and the SSH VCN 312 can be communicatively coupled to a control plane VCN 316 (e.g., the control plane VCN 116 of FIG. 1) via an LPG 310 contained in the control plane VCN 316 and to a data plane VCN 318 (e.g., the data plane VCN 118 of FIG. 1) via an LPG 310 contained in the data plane VCN 318. The control plane VCN 316 and the data plane VCN 318 can be contained in a service tenancy 319 (e.g., the service tenancy 119 of FIG. 1).

The control plane VCN 316 can include a control plane DMZ tier 320 (e.g., the control plane DMZ tier 120 of FIG. 1) that can include load balancer (LB) subnet(s) 322 (e.g., LB subnet(s) 122 of FIG. 1), a control plane app tier 324 (e.g., the control plane app tier 124 of FIG. 1) that can include app subnet(s) 326 (e.g., similar to app subnet(s) 126 of FIG. 1), and a control plane data tier 328 (e.g., the control plane data tier 128 of FIG. 1) that can include DB subnet(s) 330. The LB subnet(s) 322 contained in the control plane DMZ tier 320 can be communicatively coupled to the app subnet(s) 326 contained in the control plane app tier 324 and to an Internet gateway 334 (e.g., the Internet gateway 134 of FIG. 1) that can be contained in the control plane VCN 316, and the app subnet(s) 326 can be communicatively coupled to the DB subnet(s) 330 contained in the control plane data tier 328 and to a service gateway 336 (e.g., the service gateway of FIG. 1) and a network address translation (NAT) gateway 338 (e.g., the NAT gateway 138 of FIG. 1). The control plane VCN 316 can include the service gateway 336 and the NAT gateway 338.

The data plane VCN 318 can include a data plane app tier 346 (e.g., the data plane app tier 146 of FIG. 1), a data plane DMZ tier 348 (e.g., the data plane DMZ tier 148 of FIG. 1), and a data plane data tier 350 (e.g., the data plane data tier 150 of FIG. 1). The data plane DMZ tier 348 can include LB subnet(s) 322 that can be communicatively coupled to trusted app subnet(s) 360, untrusted app subnet(s) 362 of the data plane app tier 346, and the Internet gateway 334 contained in the data plane VCN 318. The trusted app subnet(s) 360 can be communicatively coupled to the service gateway 336 contained in the data plane VCN 318, the NAT gateway 338 contained in the data plane VCN 318, and DB subnet(s) 330 contained in the data plane data tier 350.

The untrusted app subnet(s) 362 can be communicatively coupled to the service gateway 336 contained in the data plane VCN 318 and DB subnet(s) 330 contained in the data plane data tier 350. The data plane data tier 350 can include DB subnet(s) 330 that can be communicatively coupled to the service gateway 336 contained in the data plane VCN 318.

The untrusted app subnet(s) 362 can include one or more primary VNICs 364(1)-(N) that can be communicatively coupled to tenant virtual machines (VMs) 366(1)-(N). Each tenant VM 366(1)-(N) can be communicatively coupled to a respective app subnet 367(1)-(N) that can be contained in respective container egress VCNs 368(1)-(N) that can be contained in respective customer tenancies 380(1)-(N). Respective secondary VNICs 372(1)-(N) can facilitate communication between the untrusted app subnet(s) 362 contained in the data plane VCN 318 and the app subnet contained in the container egress VCNs 368(1)-(N). Each container egress VCNs 368(1)-(N) can include a NAT gateway 338 that can be communicatively coupled to public Internet 354 (e.g., public Internet 154 of FIG. 1).

The Internet gateway 334 contained in the control plane VCN 316 and contained in the data plane VCN 318 can be communicatively coupled to a metadata management service 352 (e.g., the metadata management service 152 of FIG. 1) that can be communicatively coupled to public Internet 354. Public Internet 354 can be communicatively coupled to the NAT gateway 338 contained in the control plane VCN 316 and contained in the data plane VCN 318. The service gateway 336 contained in the control plane VCN 316 and contained in the data plane VCN 318 can be communicatively couple to cloud services 356.

In some embodiments, the data plane VCN 318 can be integrated with customer tenancies 380. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider determines whether or not to run code given to the IaaS provider by the customer.

In some examples, the customer of the IaaS provider may grant temporary network access to the IaaS provider and request a function to be attached to the data plane app tier 346. Code to run the function may be executed in the VMs 366(1)-(N), and the code may not be configured to run anywhere else on the data plane VCN 318. Each VM 366(1)-(N) may be connected to one customer tenancy 380. Respective containers 381(1)-(N) contained in the VMs 366(1)-(N) may be configured to run the code. In this case, there can be a dual isolation (e.g., the containers 381(1)-(N) running code), where the containers 381(1)-(N) may be contained in at least the VM 366(1)-(N) that are contained in the untrusted app subnet(s) 362) that may help prevent incorrect or otherwise undesirable code from damaging the network of the IaaS provider or from damaging a network of a different customer. The containers 381(1)-(N) may be communicatively coupled to the customer tenancy 380 and may be configured to transmit or receive data from the customer tenancy 380. The containers 381(1)-(N) may not be configured to transmit or receive data from any other entity in the data plane VCN 318. Upon completion of running the code, the IaaS provider may kill or otherwise dispose of the containers 381(1)-(N).

In some embodiments, the trusted app subnet(s) 360 may run code that may be owned or operated by the IaaS provider. In this embodiment, the trusted app subnet(s) 360 may be communicatively coupled to the DB subnet(s) 330 and be configured to execute CRUD operations in the DB subnet(s) 330. The untrusted app subnet(s) 362 may be communicatively coupled to the DB subnet(s) 330, but in this embodiment, the untrusted app subnet(s) may be configured to execute read operations in the DB subnet(s) 330. The containers 381(1)-(N) that can be contained in the VM 366(1)-(N) of each customer and that may run code from the customer may not be communicatively coupled with the DB subnet(s) 330.

In other embodiments, the control plane VCN 316 and the data plane VCN 318 may not be directly communicatively coupled. In this embodiment, there may be no direct communication between the control plane VCN 316 and the data plane VCN 318. However, communication can occur indirectly through at least one method. An LPG 310 may be established by the IaaS provider that can facilitate communication between the control plane VCN 316 and the data plane VCN 318. In another example, the control plane VCN 316 or the data plane VCN 318 can make a call to cloud services 356 via the service gateway 336. For example, a call to cloud services 356 from the control plane VCN 316 can include a request for a service that can communicate with the data plane VCN 318.

Figure 4:
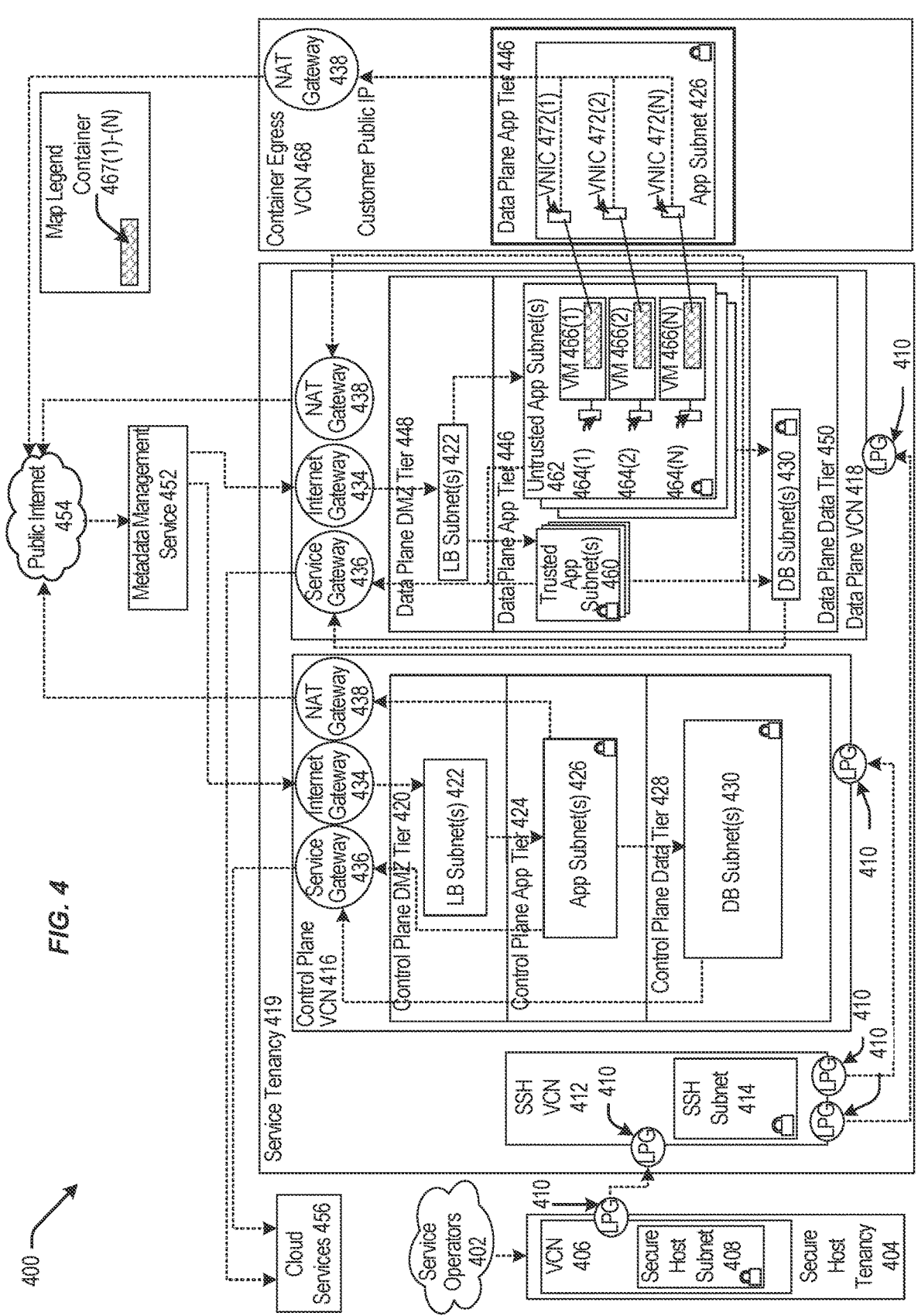

FIG. 4 is a block diagram illustrating another example pattern of an IaaS architecture 400 according to at least one embodiment. Service operators 402 (e.g., service operators 102 of FIG. 1) can be communicatively coupled to a secure host tenancy 404 (e.g., the secure host tenancy 104 of FIG. 1) that can include a virtual cloud network (VCN) 406 (e.g., the VCN 106 of FIG. 1) and a secure host subnet 408 (e.g., the secure host subnet 108 of FIG. 1). The VCN 406 can include an LPG 410 (e.g., the LPG 110 of FIG. 1) that can be communicatively coupled to an SSH VCN 412 (e.g., the SSH VCN 112 of FIG. 1) via an LPG 410 contained in the SSH VCN 412. The SSH VCN 412 can include an SSH subnet 414 (e.g., the SSH subnet 114 of FIG. 1), and the SSH VCN 412 can be communicatively coupled to a control plane VCN 416 (e.g., the control plane VCN 116 of FIG. 1) via an LPG 410 contained in the control plane VCN 416 and to a data plane VCN 418 (e.g., the data plane VCN 118 of FIG. 1) via an LPG 410 contained in the data plane VCN 418. The control plane VCN 416 and the data plane VCN 418 can be contained in a service tenancy 419 (e.g., the service tenancy 119 of FIG. 1).

The control plane VCN 416 can include a control plane DMZ tier 420 (e.g., the control plane DMZ tier 120 of FIG. 1) that can include LB subnet(s) 422 (e.g., LB subnet(s) 122 of FIG. 1), a control plane app tier 424 (e.g., the control plane app tier 124 of FIG. 1) that can include app subnet(s) 426 (e.g., app subnet(s) 126 of FIG. 1), and a control plane data tier 428 (e.g., the control plane data tier 128 of FIG. 1) that can include DB subnet(s) 430 (e.g., DB subnet(s) 330 of FIG. 3). The LB subnet(s) 422 contained in the control plane DMZ tier 420 can be communicatively coupled to the app subnet(s) 426 contained in the control plane app tier 424 and to an Internet gateway 434 (e.g., the Internet gateway 134 of FIG. 1) that can be contained in the control plane VCN 416, and the app subnet(s) 426 can be communicatively coupled to the DB subnet(s) 430 contained in the control plane data tier 428 and to a service gateway 436 (e.g., the service gateway of FIG. 1) and a network address translation (NAT) gateway 438 (e.g., the NAT gateway 138 of FIG. 1). The control plane VCN 416 can include the service gateway 436 and the NAT gateway 438.

The data plane VCN 418 can include a data plane app tier 446 (e.g., the data plane app tier 146 of FIG. 1), a data plane DMZ tier 448 (e.g., the data plane DMZ tier 148 of FIG. 1), and a data plane data tier 450 (e.g., the data plane data tier 150 of FIG. 1). The data plane DMZ tier 448 can include LB subnet(s) 422 that can be communicatively coupled to trusted app subnet(s) 460 (e.g., trusted app subnet(s) 360 of FIG. 3) and untrusted app subnet(s) 462 (e.g., untrusted app subnet(s) 362 of FIG. 3) of the data plane app tier 446 and the Internet gateway 434 contained in the data plane VCN 418. The trusted app subnet(s) 460 can be communicatively coupled to the service gateway 436 contained in the data plane VCN 418, the NAT gateway 438 contained in the data plane VCN 418, and DB subnet(s) 430 contained in the data plane data tier 450. The untrusted app subnet(s) 462 can be communicatively coupled to the service gateway 436 contained in the data plane VCN 418 and DB subnet(s) 430 contained in the data plane data tier 450. The data plane data tier 450 can include DB subnet(s) 430 that can be communicatively coupled to the service gateway 436 contained in the data plane VCN 418.

The untrusted app subnet(s) 462 can include primary VNICs 464(1)-(N) that can be communicatively coupled to tenant virtual machines (VMs) 466(1)-(N) residing within the untrusted app subnet(s) 462. Each tenant VM 466(1)-(N) can run code in a respective container 467(1)-(N) and be communicatively coupled to an app subnet 426 that can be contained in a data plane app tier 446 that can be contained in a container egress VCN 468. Respective secondary VNICs 472(1)-(N) can facilitate communication between the untrusted app subnet(s) 462 contained in the data plane VCN 418 and the app subnet contained in the container egress VCN 468. The container egress VCN can include a NAT gateway 438 that can be communicatively coupled to public Internet 454 (e.g., public Internet 154 of FIG. 1).

The Internet gateway 434 contained in the control plane VCN 416 and contained in the data plane VCN 418 can be communicatively coupled to a metadata management service 452 (e.g., the metadata management service 152 of FIG. 1) that can be communicatively coupled to public Internet 454. Public Internet 454 can be communicatively coupled to the NAT gateway 438 contained in the control plane VCN 416 and contained in the data plane VCN 418. The service gateway 436 contained in the control plane VCN 416 and contained in the data plane VCN 418 can be communicatively couple to cloud services 456.

In some examples, the pattern illustrated by the architecture of block diagram 400 of FIG. 4 may be considered an exception to the pattern illustrated by the architecture of block diagram 300 of FIG. 3 and may be desirable for a customer of the IaaS provider if the IaaS provider cannot directly communicate with the customer (e.g., a disconnected region). The respective containers 467(1)-(N) that are contained in the VMs 466(1)-(N) for each customer can be accessed in real-time by the customer. The containers 467 (1)-(N) may be configured to make calls to respective secondary VNICs 472(1)-(N) contained in app subnet(s) 426 of the data plane app tier 446 that can be contained in the container egress VCN 468. The secondary VNICs 472(1)- (N) can transmit the calls to the NAT gateway 438 that may transmit the calls to public Internet 454. In this example, the containers 467(1)-(N) that can be accessed in real time by the customer can be isolated from the control plane VCN 416 and can be isolated from other entities contained in the data plane VCN 418. The containers 467(1)-(N) may also be isolated from resources from other customers.

In other examples, the customer can use the containers 467(1)-(N) to call cloud services 456. In this example, the customer may run code in the containers 467(1)-(N) that request a service from cloud services 456. The containers 467(1)-(N) can transmit this request to the secondary VNICs 472(1)-(N) that can transmit the request to the NAT gateway that can transmit the request to public Internet 454. Public Internet 454 can transmit the request to LB subnet(s) 422 contained in the control plane VCN 416 via the Internet gateway 434. In response to determining the request is valid, the LB subnet(s) can transmit the request to app subnet(s) 426 that can transmit the request to cloud services 456 via the service gateway 436.

It should be appreciated that IaaS architectures 100, 200, 300, and 400 may include components that are different and/or additional to the components shown in the figures. Further, the embodiments shown in the figures represent non-exhaustive examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

In one or more embodiments, a computer network provides connectivity among a set of nodes. The nodes are local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as execution of a particular application and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally, or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network such as a physical network. Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process, such as a virtual machine, an application instance, or a thread. A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on one or more of the following: (a) the computing services requested by a particular client, (b) the aggregated computing services requested by a particular tenant, or (c) the aggregated computing services requested of the computer network. Such a computer network may be referred to as a "cloud network."

In an embodiment, a service provider provides a cloud network to one or more end users. Various service models are implemented by the cloud network, including, but not limited to, Software-as-a-Service (SaaS), Platform-as-a-Service (PaaS), and Infrastructure-as-a-Service (IaaS). In SaaS, a service provider provides end users the capability to use the service provider's applications that are executing on the network resources. In PaaS, the service provider provides end users the capability to deploy custom applications onto the network resources. The custom applications are created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models are implemented by a computer network, including, but not limited to, a private cloud, a public cloud, and a hybrid cloud. In a private cloud, network resources are provisioned for exclusive use by a particular group of one or more entities; the term "entity" as used herein refers to a corporation, organization, person, or other entity. The network resources are local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources are local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QOS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches are used.

In an embodiment, each tenant is associated with a tenant ID. Each network resource of the multi-tenant computer network is tagged with a tenant ID. A tenant is permitted access to a particular network resource when the tenant and the particular network resources are associated with a same tenant ID.

In an embodiment, each tenant is associated with a tenant ID. Each application, implemented by the computer network, is tagged with a tenant ID. Additionally, or alternatively, each data structure and/or dataset, stored by the computer network, is tagged with a tenant ID. A tenant is permitted access to a particular application, data structure, and/or dataset when the tenant and the particular application, data structure, and/or dataset are associated with a same tenant ID.

As an example, each database implemented by a multi-tenant computer network may be tagged with a tenant ID. A tenant associated with the corresponding tenant ID may access data of a particular database. As another example, each entry in a database implemented by a multi-tenant computer network may be tagged with a tenant ID. A tenant associated with the corresponding tenant ID may access data of a particular entry. However, multiple tenants may share the database.

In an embodiment, a subscription list identifies a set of tenants, and, for each tenant, a set of applications that the tenant is authorized to access. For each application, a list of tenant IDs of tenants authorized to access the application is stored. A tenant is permitted access to a particular application when the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may be transmitted to other devices within the same tenant overlay network. Encapsulation tunnels are used to prohibit any transmissions from a source device on a tenant overlay network to devices in other tenant overlay networks. Specifically, the packets received from the source device are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

4. COMPUTER SYSTEM

Figure 5:
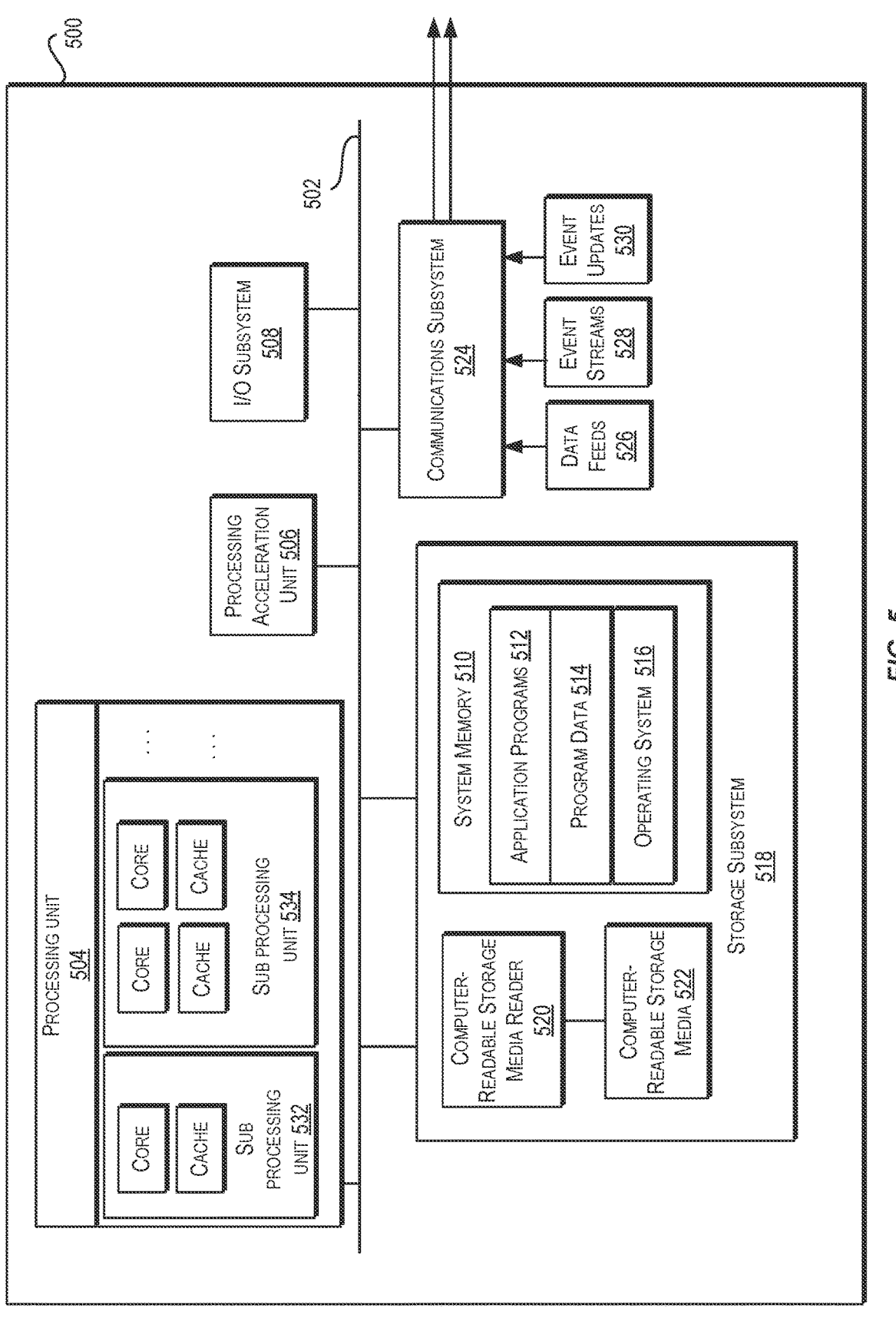
FIG. 5 is a hardware system in accordance with one or more embodiments.

FIG. 5 illustrates an example computer system 500. An embodiment of the disclosure may be implemented upon the computer system 500. As shown in FIG. 5, computer system 500 includes a processing unit 504 that communicates with peripheral subsystems via a bus subsystem 502. These peripheral subsystems include a processing acceleration unit 506, an I/O subsystem 508, a storage subsystem 518, and a communications subsystem 524. Storage subsystem 518 includes tangible computer-readable storage media 522 and a system memory 510.

Bus subsystem 502 provides a mechanism for letting the various components and subsystems of computer system 500 to communicate with each other as intended. Although bus subsystem 502 is shown schematically as a single bus, alternative embodiments of the bus subsystem may utilize multiple buses. Bus subsystem 502 may be any of several types of bus structures, including a memory bus or memory controller, a peripheral bus, and a local bus using any of a variety of bus architectures. For example, such architectures include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus. Additionally, such architectures are implemented as a Mezzanine bus manufactured to the IEEE P1386.1 standard.

Processing unit 504 controls the operation of computer system 500. Processing unit 504 can be implemented as one or more integrated circuits (e.g., a conventional microprocessor or microcontroller). One or more processors are included in processing unit 504. These processors include single core or multicore processors. In certain embodiments, processing unit 504 may be implemented as one or more independent processing units 532 and/or 534 with single or multicore processors included in each processing unit. In other embodiments, processing unit 504 may also be implemented as a quad-core processing unit formed by integrating two dual-core processors into a single chip.

In various embodiments, processing unit 504 can execute a variety of programs in response to program code and can maintain multiple concurrently executing programs or processes. At any given time, the program code to be executed can be wholly or partially resident in processing unit 504 and/or in storage subsystem 518. Through suitable programming, processing unit 504 can provide various functionalities described above. Computer system 500 may additionally include a processing acceleration unit 506 that can include a digital signal processor (DSP), a special-purpose processor, and/or the like.

I/O subsystem 508 may include user interface input devices and user interface output devices. User interface input devices include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices include medical imaging input devices such as computed tomography, magnetic resonance imaging, position emission tomography, or medical ultrasonography devices. User interface input devices may also include audio input devices such as MIDI keyboards, digital musical instruments and the like.

User interface output devices include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include any type of device and mechanism for outputting information from computer system 500 to a user or other computer. For example, user interface output devices include, without limitation, a variety of display devices that visually convey text, graphics and audio/video information, such as monitors, printers, speakers, headphones, automotive navigation systems, plotters, voice output devices, and modems.

Computer system 500 may comprise a storage subsystem 518 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 504 provide the functionality described above. Storage subsystem 518 may also provide a repository for storing data used in accordance with the present disclosure.

As depicted in the example in FIG. 5, storage subsystem 518 can include various components, including a system memory 510, computer-readable storage media 522, and a computer readable storage media reader 520. System memory 510 may store program instructions, such as application programs 512, that are loadable and executable by processing unit 504. System memory 510 may also store data, such as program data 514, that is used during the execution of the instructions and/or data that is generated during the execution of the program instructions. Various programs are loaded into system memory 510 including, but not limited to, client applications, Web browsers, mid-tier applications, relational database management systems (RDBMS), virtual machines, containers, etc.

System memory 510 may also store an operating system 516. Examples of operating system 516 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 500 executes one or more virtual machines, the virtual machines along with their guest operating systems (GOSs) may be loaded into system memory 510 and executed by one or more processors or cores of processing unit 504.

System memory 510 can come in different configurations depending upon the type of computer system 500. For example, system memory 510 may be volatile memory (such as random access memory (RAM)) and/or non-volatile memory (such as read-only memory (ROM), flash memory, etc.). Different types of RAM configurations are provided, including a static random access memory (SRAM), a dynamic random access memory (DRAM), and others. In some implementations, system memory 510 may include a basic input/output system (BIOS) containing basic routines that help to transfer information between elements within computer system 500 such as during start-up.

Computer-readable storage media 522 may represent remote, local, fixed, and/or removable storage devices plus storage media for temporarily and/or more permanently containing, storing, computer-readable information for use by computer system 500, including instructions executable by processing unit 504 of computer system 500.

Computer-readable storage media 522 can include any appropriate media known or used in the art, including storage media and communication media, such as but not limited to volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 522 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 522 may include, but is not limited to, Zip® drives, flash memory cards, universal serial bus (USB) flash drives, secure digital (SD) cards, DVD disks, digital video tape, and the like. Computer-readable storage media 522 may also include solid-state drives (SSD) based on non-volatile memory, such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Machine-readable instructions executable by one or more processors or cores of processing unit 504 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 524 provides an interface to other computer systems and networks. Communications subsystem 524 serves as an interface for receiving data from and transmitting data to other systems from computer system 500. For example, communications subsystem 524 may enable computer system 500 to connect to one or more devices via the Internet. In some embodiments, communications subsystem 524 can include radio frequency (RF) transceiver components to access wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments, communications subsystem 524 can provide wired network connectivity (e.g., Ethernet) in addition to or instead of a wireless interface.

In some embodiments, communications subsystem 524 may also receive input communication in the form of structured and/or unstructured data feeds 526, event streams 528, event updates 530, and the like on behalf of one or more users who may use computer system 500.

By way of example, communications subsystem 524 may be configured to receive data feeds 526 in real-time from users of social networks and/or other communication services, such as Twitter® feeds, Facebook® updates, web feeds such as Rich Site Summary (RSS) feeds, and/or real-time updates from one or more third party information sources.

Additionally, communications subsystem 524 may be configured to receive data in the form of continuous data streams. The continuous data streams include event streams 528 of real-time events and/or event updates 530 that may be continuous or unbounded in nature with no explicit end. Examples of applications that generate continuous data may include sensor data applications, financial tickers, network performance measuring tools (e.g., network monitoring and traffic management applications), clickstream analysis tools, automobile traffic monitoring, and the like.

Communications subsystem 524 may also be configured to output the structured and/or unstructured data feeds 526, event streams 528, event updates 530, and the like to one or more databases that may be in communication with one or more streaming data source computers coupled to computer system 500.

Computer system 500 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 500 depicted in FIG. 5 is intended as a non-limiting example. Many other configurations having more or fewer components than the system depicted in FIG. 5 are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

5. ARCHITECTURAL OVERVIEW

Figure 6A:
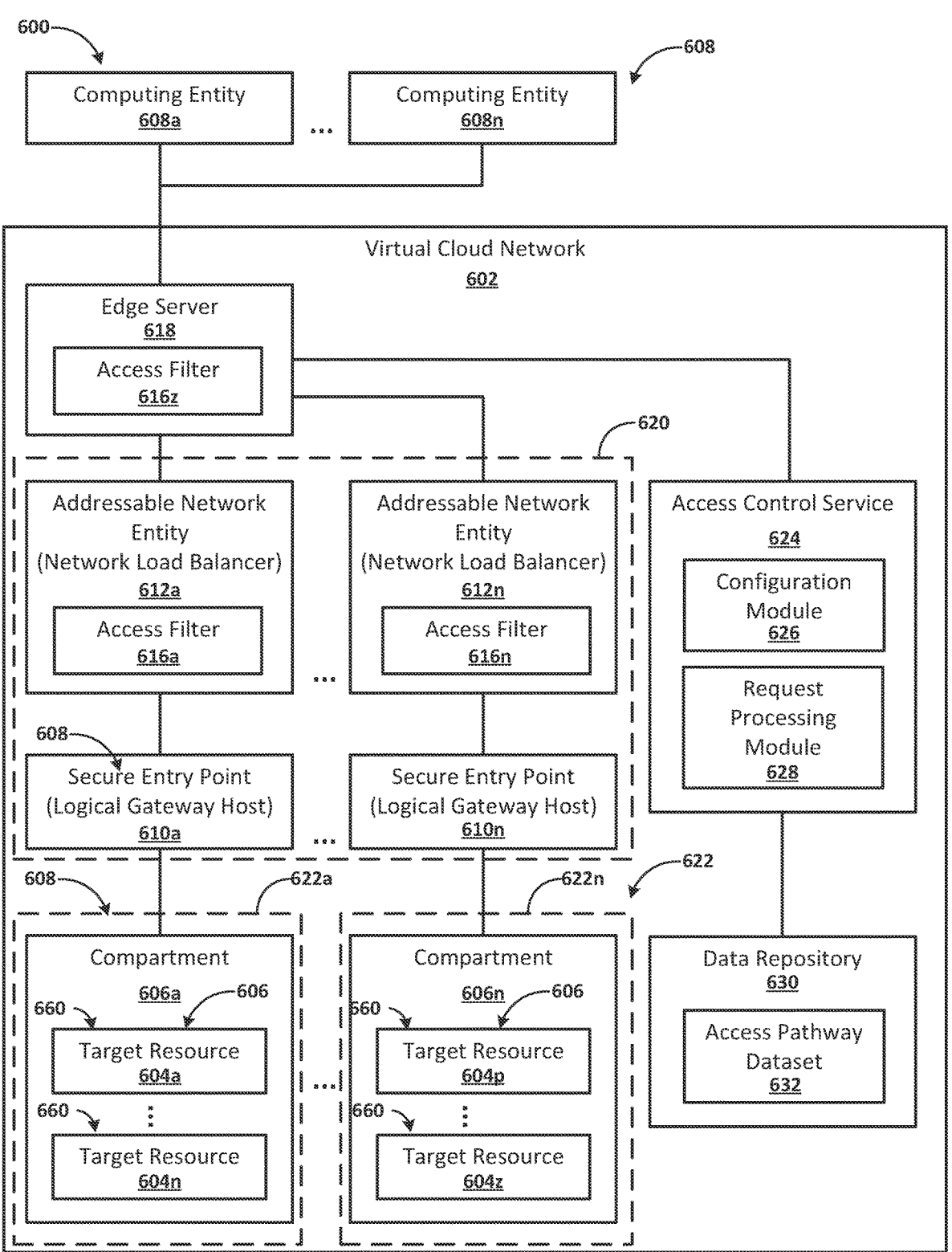
FIGS. 6A and 6B illustrate features of an example system in accordance with one or more embodiments.
Figure 6B:
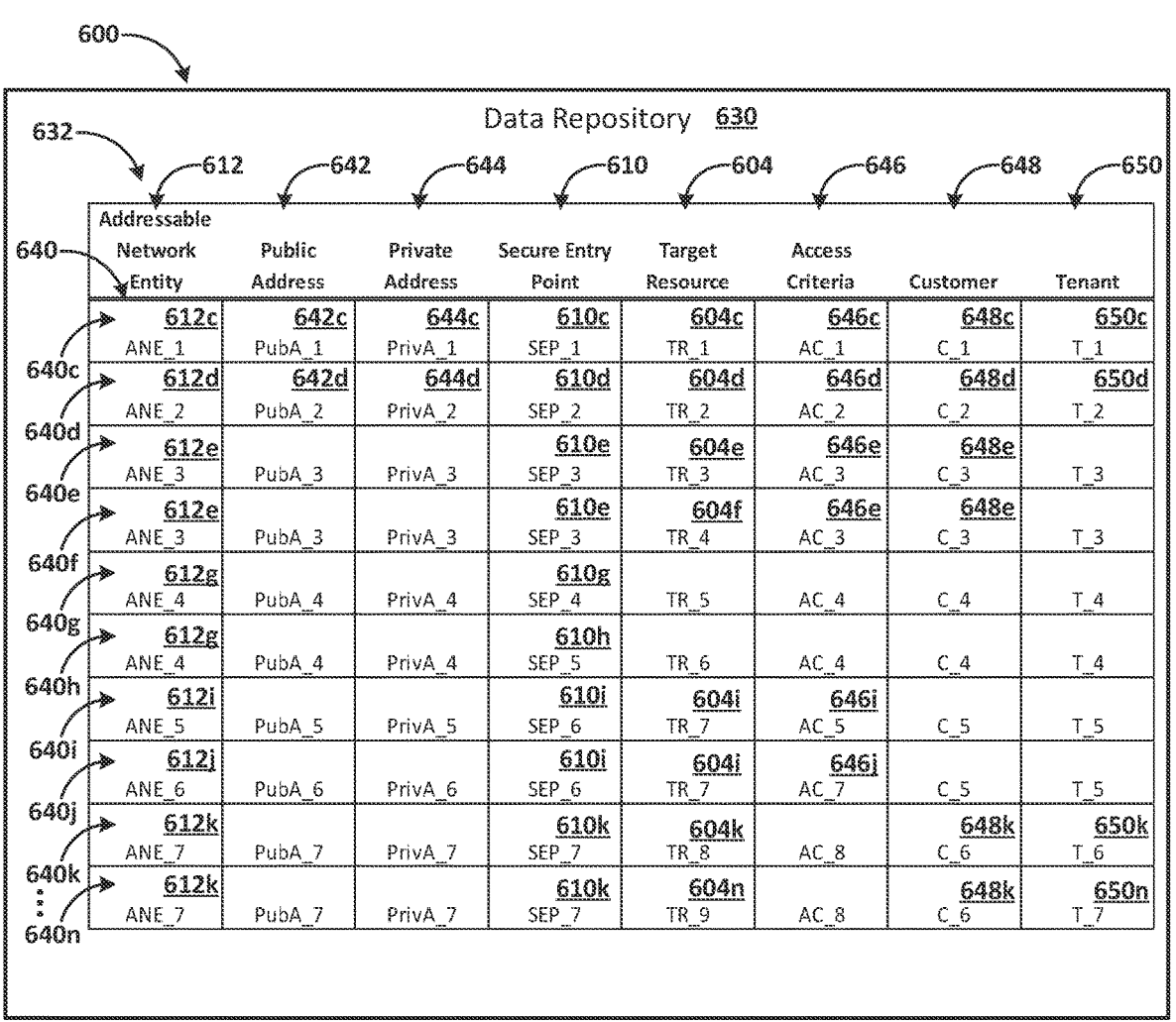

FIGS. 6A and 6B illustrate one example of a system 600 in accordance with one or more embodiments. The system 600 described with reference to FIGS. 6A and 6B may perform operations pertaining to configuring dedicated secure entry points for accessing particular target resources of a virtual cloud network. Additionally, or alternatively, the system 600 described with reference to FIGS. 6A and 6B may perform operations pertaining to providing computing entities with destination addresses for requests associated with particular target resources. Additionally, or alternatively, the system 600 described with reference to FIGS. 6A and 6B may perform operations pertaining to accessing target resources via dedicated secure entry points.
A. Example Computing Network As shown in FIG. 6A, the system 600 includes a computing network such as a virtual cloud network 602. The virtual cloud network 602 includes one or more target resources 604 (such as target resource 604a, target resource 604n, target resource 604p, and target resource 604z). The target resources 604 may be respectively located in one or more compartments 606, such as compartment 606a or compartment 606n. For example, as shown, target resource 604a and target resource 604n are located in compartment 606a. Additionally, as shown, target resource 604p and target resource 604z are located in compartment 606n. Additionally, or alternatively, a target resource 604 may be a compartment 606 that includes one or more additional cloud resources. Additionally, or alternatively, one or more target resources 604 may be located outside of a compartment 606 such as in a different portion of the virtual cloud network 602. The target resources 604 may be secured from unauthorized access, for example, within a respective compartment 606 of the virtual cloud network 602. In one example, a compartment 606 may be associated with a particular tenant. Additionally, or alternatively, a compartment 606 may be associated with cloud provider. A compartment 606 that is associated with a cloud provider may encompass one or more additional compartments 606 associated with a particular tenant. For example, a compartment that is associated with a cloud provider may encompass a first compartment associated with a first tenant and a second compartment associated with a second tenant. Additionally, or alternatively, a compartment 606 associated with a cloud provider and one or more compartments 606 associated with various tenants may respectively represent separate portions of the virtual cloud network 602.

In one example, the system 600 includes one or more computing entities 608 (such as computing entity 608a and computing entity 608n) that may access one or more target resources 604 of the virtual cloud network 602. The access of a target resource 604 by a computing entity 608 includes data access operations, such as read, write, update, delete, create, search, append, index, lock, log, audit, monitor, backup, or restore, as well as combinations of these. The access includes transactional operations that include a combination of data access operations. Additionally, or alternatively, the access includes batch operations that respectively include a set of data access operations. Additionally, or alternatively, the access includes streaming operations that include a continuous or intermittent stream of data access operations. The one or more computing entities 608 may be located external to the virtual cloud network 602. Additionally, or alternatively, the one or more computing entities 608 may be located within the virtual cloud network 602. In one example, the one or more computing entities 608 may be associated with a cloud operator. The cloud operator may utilize the one or more computing entities 608 to access one or more target resources 604 to provide technical support services.

In one example, the virtual cloud network 602 may represent a portion of a multi-cloud network. For example, a first virtual cloud network (e.g., virtual cloud network 602) may be associated with a first cloud provider, and a second virtual cloud network (not shown) may be associated with a second cloud provider. The first virtual cloud network (e.g., virtual cloud network 602) includes one or more target resources 604, and the second virtual cloud network (not shown) includes one or more computing entities 608 that may access the one or more target resources 604. Additionally, or alternatively, the one or more computing entities 608 may be located on an on-premises network.

Referring further to FIG. 6A, the virtual cloud network 602 includes a set of secure entry points 610 and a set of addressable network entities 612. A target resource 604 may be associated with a particular secure entry point 610. The particular secure entry point 610 associated with the target resource 604 may serve as a dedicated point of entry for a computing entity 608 to securely access the target resource 604. The secure entry points 610 are not directly accessible by computing entities 608. The secure entry points 610 are respectively associated with an addressable network entity 612 that serves as a destination that computing entities 608 may utilize to access a target resource through a corresponding secure entry point 610. A secure entry point 610 corresponding to a particular target resource 604 may represent an authorized pathway, such as a single authorized pathway, for a computing entity 608 to access the particular target resource 604. The addressable network entity 612 corresponding to the particular target resource 604 may represent the destination for requests from the computing entity 608 to utilize the authorized pathway to access the particular target resource 604.

In one example, a secure entry point 610 includes a compute instance that serves as a logical gateway host. The logical gateway host may be configured to provide restricted access to target resources 604. The restricted access are provided via a secure shell protocol (SSH). In one example, the logical gateway host includes a BASTION™ service that is available as part of the OCI provided by the present assignee.

In one example, an addressable network entity 612 includes a network load balancer. The network load balancer may be allocated specifically for network traffic associated with a corresponding secure entry point 610. The network load balancer may be implemented as a load balancer as-a-service (LBaaS). The set of addressable network entities 612 may respectively include a network load balancer implemented as an LBaaS. The network load balancers are respectively implemented as an active-active load balancer configuration, meaning that each network load balancer may actively serve requests associated with the corresponding secure entry point 610. An active-active configuration contrasts with an active-passive configuration in that for an active-active configuration, one load balancer handles traffic, while others remain in standby. In one example, a plurality of network load balancers may concurrently serve requests from various computing entities associated with particular target resources 604.

As shown in FIG. 6A, requests associated with target resource 604*a* and/or target resource 604*n* may utilize secure entry point 610*a* as a dedicated point of entry. Addressable network entity 612*a* may serve as a destination for requests to access target resource 604*a* and/or target resource 604*n* via the secure entry point 610*a*. Additionally, or alternatively, requests associated with target resource 604*p* and/or target resource 604*z* may utilize secure entry point 610*n* as a dedicated point of entry. Addressable network entity 612*n* may serve as a destination for requests to access target resource 604*p* and/or target resource 604*z* via the secure entry point 610*n*. In one example, computing entity 608*a* may be authorized to access target resource 604*a* and/or target resource 604*n* via secure entry point 610*a*. Additionally, or alternatively, computing entity 608*n* may be unauthorized to access target resource 604*a* and/or target resource 604*n* via secure entry point 610*a*. In one example, computing entity 608*n* may be authorized to access target resource 604*p* and/or target resource 604*z* via secure entry point 610*n*. Additionally, or alternatively, computing entity 608*a* may be unauthorized to access target resource 604*p* and/or target resource 604*z* via secure entry point 610*n*.

In one example, use of a secure entry point 610 by a computing entity 608 may be conditioned upon the computing entity satisfying one or more access conditions. The one or more access conditions are specific to a particular secure entry point 610. In one example, use of secure entry point 610*a* may be conditioned upon satisfying a first set of access conditions, and use of secure entry point 610*n* may be conditioned upon satisfying a second set of access conditions that differs from the first set of access conditions. The access conditions are implemented by one or more access filters 616 (such as access filter 616*a*, access filter 616*n*, and/or access filter 616*z*). In one example, an addressable network entity 612 includes an access filter 616 utilized to validate requests against a set of one or more access conditions. For example, as shown in FIG. 6A, addressable network entity 612*a* includes access filter 616*a*, and addressable network entity 612*n* includes access filter 616*n*. Requests associated with secure entry point 610*a* may be validated against the first set of access conditions of access filter 616*a*. Requests associated with secure entry point 610*n* may be validated against the second set of access conditions of access filter 616*n*. Upon satisfaction of the applicable access criteria, the addressable network entity 612 may forward the request to the corresponding secure entry point 610, and a secure connection that passes through the secure entry point 610 may be established between the computing entity 608 and the target resource 604.

In one example, the virtual cloud network 602 includes an edge server 618. The edge server 618 may receive requests from computing entities and may forward the requests to the respective addressable network entities 612. In one example, the edge server 618 includes access filter 616*z*. Requests received at the edge server 618 may be validated against a set of one or more access conditions of access filter 616*z*. The edge server 618 may forward requests that satisfy the set of one or more access conditions of access filter 616*z* to the addressable network entity 612 corresponding to the particular request.

In one example, the set of access criteria includes a geolocation restriction. The geolocation restriction may allow requests from computing entities corresponding to a particular set of one or more geographical locations. Additionally, or alternatively, the geolocation restriction may deny requests from computing entities corresponding to a particular set of one or more geographical locations. In one example, the set of access criteria includes a MAC address restriction. The MAC address restriction may allow requests from computing entities corresponding to a particular set of one or more MAC addresses. Additionally, or alternatively, the MAC address restriction may deny requests from computing entities corresponding to a particular set of one or more MAC addresses. The MAC address restriction may correspond to a particular set of computing devices that are provisioned for accessing a particular set of target resources 604. In one example, the set of access criteria includes an IP address restriction. The IP address restriction may allow requests from a particular set of one or more IP addresses. Additionally, or alternatively, the IP address restriction may deny requests from a particular set of one or more IP addresses. The IP address restriction may correspond to a particular set of IP addresses allocated to a particular set of computing devices that are provisioned for accessing a particular set of target resources 604.

In one example, an access filter 616 includes a filter configured to validate that a network address identified in an access request corresponds to an addressable network entity 612 of the virtual cloud network 602. The filter may validate that an addressable network entity 612 of the virtual cloud network 602 has a network address that matches the access request. Additionally, or alternatively, the filter may validate that the access request is authorized to be transmitted to the addressable network entity 612 corresponding to the network address identified in the access request.

In one example, an access filter 616 includes a filter configured to validate a source address corresponding to an access request against a set of one or more authorized source addresses. The one or more authorized source addresses include a set of IP addresses and/or MAC addresses corresponding to a fleet of computing entities that are authorized to access a set of one or more target resources 604. Additionally, or alternatively, the authorized source addresses may correspond to one or more geographic locations associated with a geolocation restriction.

Referring further to FIG. 6A, the virtual cloud network 602 includes at least one public subnet 620 and at least one private subnet 622. The edge server 618 may provide access to the public subnet 620. The public subnet includes one or more addressable network entities 612 and a corresponding one or more secure entry points 610. The one or more secure entry points 610 may provide access to one or more private subnets 622. The target resources 604 and/or the compartments 606, respectively, may be located in one or more private subnets 622. In one example, as shown in FIG. 6A, compartment 606*a* may be located in private subnet 622*a*, and compartment 606*n* may be located in private subnet 622*n*. Additionally, or alternatively, target resource 604*a* and target resource 604*n* may be located in private subnet 622*a*, and target resource 604*p* and target resource 604*z* may be located in private subnet 622*n*. Secure entry point 610*a* may provide access to private subnet 622*a*, such as to the compartments 606 and/or target resources 604 in private subnet 622*a*. Additionally, or alternatively, secure entry point 610*n* may provide access to private subnet 622*n*, such as to the compartments 606 and/or target resources 604 in private subnet 622*n*.

Referring further to FIG. 6A, the virtual cloud network 602 includes an access control service 624. The access control service 624 may execute operations associated with configuring access pathways for computing entities 608 to access particular target resources 604. Additionally, or alternatively, access control service 624 may execute operations associated with providing destination addresses to computing entities 608 for requests associated with particular target resources 604. Additionally, or alternatively, access control service 624 may execute operations associated with validating requests from computing entities 608 pertaining to particular target resources 604.

In one example, the access control service 624 includes a configuration module 626. The configuration module 626 may execute operations associated with configuring access pathways for computing entities 608 to access particular target resources 604. The operations, associated with configuring access pathways for computing entities 608 to access particular target resources 604, include instantiating addressable network entities 612 and secure entry points 610. The operations associated with configuring access pathways for computing entities 608 to access particular target resources 604 may further include associating particular target resources 604 with particular secure entry points 610 and/or associating particular secure entry points 610 with particular addressable network entities. The operations associated with configuring access pathways for computing entities 608 to access particular target resources 604 may further include configuring access filters 616 corresponding to sets of one or more access criteria for accessing particular target resources 604. The operations associated with configuring access pathways for computing entities 608 to access particular target resources 604 may further include providing computing entities 608 with network addresses of addressable network entities 612 that serve as destinations for accessing particular target resources 604.

In one example, the access control service 624 includes a request processing module 628. The request processing module 628 may execute operations associated with validating requests from computing entities 608 pertaining to particular target resources 604. The request processing module 628 may validate requests from computing entities 608 against sets of access criteria corresponding to a particular access filter 616. Additionally, or alternatively, the request processing module 628 determines secure entry points 610 corresponding to particular addressable network entities 612. Further, the request processing module 628 may forward requests received at an addressable network entity 612 to a corresponding secure entry point 610 upon having validated the requests against the applicable set of one or more access criteria.

Referring further to FIG. 6A, the virtual cloud network 602 includes a data repository 630. The data repository 630 includes an access pathway dataset 632. The access pathway dataset 632 includes mappings corresponding to access pathways for accessing particular target resources 604. In one example, the access pathway dataset 632 includes mappings between target resources 604 and secure entry points 610 that are utilized to access particular target resources 604. Additionally, or alternatively, the pathway dataset 632 includes mappings between secure entry points 610 and addressable network entities 612 that serve as destinations for computing entities to access a particular secure entry point 610. Additionally, or alternatively, the pathway dataset 632 includes mappings between addressable network entities 612 and sets of access criteria for accessing target resources 604.

B. Example Data Repository

Referring to FIG. 6B, an example data repository 630 is further described. The data repository 630 includes an access pathway dataset 632 that includes a set of access pathways 640 for accessing particular target resources 604. As shown in FIG. 6B, the set of access pathways 640 include access pathway 640c and access pathway 640d. Access pathway 640c may map addressable network entity 612c to secure entry point 610c. Additionally, access pathway 640c may map secure entry point 610c to target resource 604c. Addressable network entity 612c may serve as a destination for accessing target resource 604c via secure entry point 610c. Access pathway 640d may map addressable network entity 612d to secure entry point 610d. Additionally, access pathway 640d may map secure entry point 610d to target resource 604d. Addressable network entity 612d may serve as a destination for accessing target resource 604d via secure entry point 610d.

The access pathway dataset 632 includes a public network address 642 for each of the addressable network entities 612. The public network address 642 of an addressable network entity 612 may serve as a destination address for a computing entity 608 (FIG. 6A) to access a target resource 604. The computing device may access the target resource 604 via the secure entry point 610 for the target resource 604 by transmitting a request to the public network address 642 corresponding to the addressable network entity 612 mapped to the secure entry point 610. Additionally, or alternatively, the access pathway dataset 632 includes a private network address 644 for each of the addressable network entities 612. The private network address 644 may be mapped to the secure entry point 610. The private network address 644 is utilized to establish a secure connection between the addressable network entity 612 and the secure entry point 610.

As shown in FIG. 6B, public network address 642c and private network address 644c may be associated with addressable network entity 612c. A computing entity 608 may transmit requests to access target resource 604c to addressable network entity 612c. A secure connection for computing entity 608 (FIG. 6A) to access target resource 604c may be established between addressable network entity 612c and secure entry point 610c using private network address 644c. Additionally, or alternatively, public network address 642d and private network address 644d may be associated with addressable network entity 612d. A computing entity 608 may transmit requests to access target resource 604d to addressable network entity 612d. A secure connection for computing entity 608 to access target resource 604d may be established between addressable network entity 612d and secure entry point 610d using private network address 644d.

In one example, the respective access pathways 640 may be associated with a particular set of access criteria 646. For example, as shown in FIG. 6B, access pathway 640c may be associated with access criteria 646c. Additionally, or alternatively, access pathway 640d may be associated with access criteria 646d. Different access pathways 640 may be provided at least in part to implement particular sets of access criteria for particular target resources 604.

In one example, the respective access pathways 640 may be associated with a particular customer 648. For example, as shown in FIG. 6B, access pathway 640c may be associated with customer 648c. Additionally, or alternatively, access pathway 640d may be associated with customer 648d. Different access pathways 640 may be provided at least in part to implement different sets of access criteria for the respective customers 648.

Additionally, or alternatively, the respective access pathways 640 may be associated with a particular customer 648 and/or a particular tenant 650. For example, as shown in FIG. 6B, access pathway 640c may be associated with customer 648c and tenant 650c. Additionally, or alternatively, access pathway 640d may be associated with customer 648d and tenant 650d. Different access pathways 640 may be provided at least in part to implement different sets of access criteria for the respective customers 648 and/or tenants 650. In one example, target resource 604c may be associated with customer 648c and tenant 650c, and target resource 604d may be associated with customer 648d and tenant 650d. Additionally, or alternatively, target resource 604c includes a first compartment hosted for customer 648c by tenant 650c, and target resource 604d includes a second compartment hosted for customer 648d by tenant 650d. In one example, a target resource may be associated with different customers of the same tenant. For example, tenant 650c and tenant 650d may be the same tenant 650, with target resource 604c associated with customer 648c, and target resource 604d associated with customer 648d. Additionally, or alternatively, target resource 604c includes a first compartment allocated by the tenant 650 for customer 648c, and target resource 604d includes a second compartment allocated by the tenant 650 for customer 648d.

In one example, access pathways 640 for different target resources 604 may utilize the same addressable network entity 612. The same addressable network entity 612 is utilized for different access pathways 640, for example, to access target resources that are subject to the same access criteria 646 and/or that are associated with the same customer 648. For example, as shown in FIG. 6B, access pathway 640e and access pathway 640f may respectively utilize addressable network entity 612e as a destination for computing entities 608 to access target resource 604e and target resource 604f subject to satisfying access criteria 646e.

Additionally, or alternatively, access pathways 640 for different target resources 604 may utilize the same secure entry point 610. The same secure entry point 610 is utilized for different access pathways 640, for example, to access target resources that are located in the same compartment 606 and/or that are associated with the same customer 648. For example, as shown in FIG. 6B, access pathway 640e and access pathway 640f may utilize secure entry point 610e to access target resource 604e and target resource 604f associated with customer 648e.

In one example, access pathways 640 for different target resources 604 may utilize the same addressable network entity 612 and a different secure entry point 610, for example, when the target resources 604 are subject to the same access criteria 646 and are located in different compartments 606 (FIG. 6A). As shown in FIG. 6B, access pathway 640g and access pathway 640h may utilize the same addressable network entity 612 (addressable network entity 612g) and different secure entry points (secure entry point 610g and 610h, respectively).

In one example, different access pathways 640 may be provided for accessing the same target resource 604, for example, via the same secure entry point 610. For example, different access pathways 640 may be provided for accessing the same target resource 604 to provide different sets of access criteria 646 for accessing the target resource 604. As shown in FIG. 6B, access pathway 612i and access pathway 612j may respectively provide access to target resource 604i via secure entry point 610i. Access criteria 646i may be associated with target resource 604i, and access criteria 646j may be associated with target resource 604j. The different sets of access criteria 646 are utilized to provide restricted access conditions to different computing entities 608 (FIG. 6A), different users, and/or different geographic locations.

In one example, different target resources 604 may be accessed via respective access pathways 640 that utilize the same addressable network entity 612 and the same secure entry point 610. For example, target resources 604 of a customer 648 corresponding to different tenants 650 may be accessed utilizing respective access pathways 640 that utilize the same addressable network entity 612 and the same secure entry point 610. As shown in FIG. 6B, access pathway 640k and access pathway 640n associated with customer 648k may utilize the same addressable network entity (addressable network entity 612k) and the same secure entry point 610 (secure entry point 610k) to access different target resources 604 (target resource 604k and target resource 604n, respectively). In one example, as shown in FIG. 6B, the different target resources 604 may be associated with different tenants 650. For example, the customer 648 may receive different services from different tenants, and the different target resources 604 may respectively be associated with the different services. In one example, target resource 604k may be associated with customer 648k and tenant 650k, and target resource 604n may be associated with customer 648k and tenant 650n. Additionally, or alternatively, target resource 604k includes a first compartment hosted for customer 648k by tenant 650k, and target resource 604n includes a second compartment hosted for customer 648k by tenant 650n.

The data repository 630 includes any type of storage unit and/or device (e.g., a file system, database, collection of tables, or any other storage mechanism) for storing data. Further, the data repository 630 includes multiple different storage units and/or devices. The multiple different storage units and/or devices may or may not be of the same type or located at the same physical site. The data repository 630 may share one or more storage units with another storage unit or device. Additionally, or alternatively, the data repository 630 includes one or more storage units that differ from one another. Further, the data repository 630 may be implemented or executed on the same computing system as virtual cloud network 602. Additionally, or alternatively, the data repository 630 may be implemented or executed on a computing system separate from virtual cloud network 602.

In one or more embodiments, the system 600 includes more or fewer components than the components illustrated in FIGS. 6A and 6B. The components illustrated in FIGS. 6A and 6B may be local to or remote from each other. The components illustrated in FIGS. 6A and 6B include software and/or hardware components. Each component may be distributed over multiple applications and/or machines. Multiple components are combined into one application and/or machine. Operations described with respect to one component may instead be performed by another component. Additional embodiments and/or examples relating to the system 600 are described above in Section 2, titled "Cloud Computing Technology".

In an embodiment, the system 600 includes various components implemented on one or more digital devices. The term "digital device" refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

6. EXAMPLE OPERATIONS

Figure 7A:
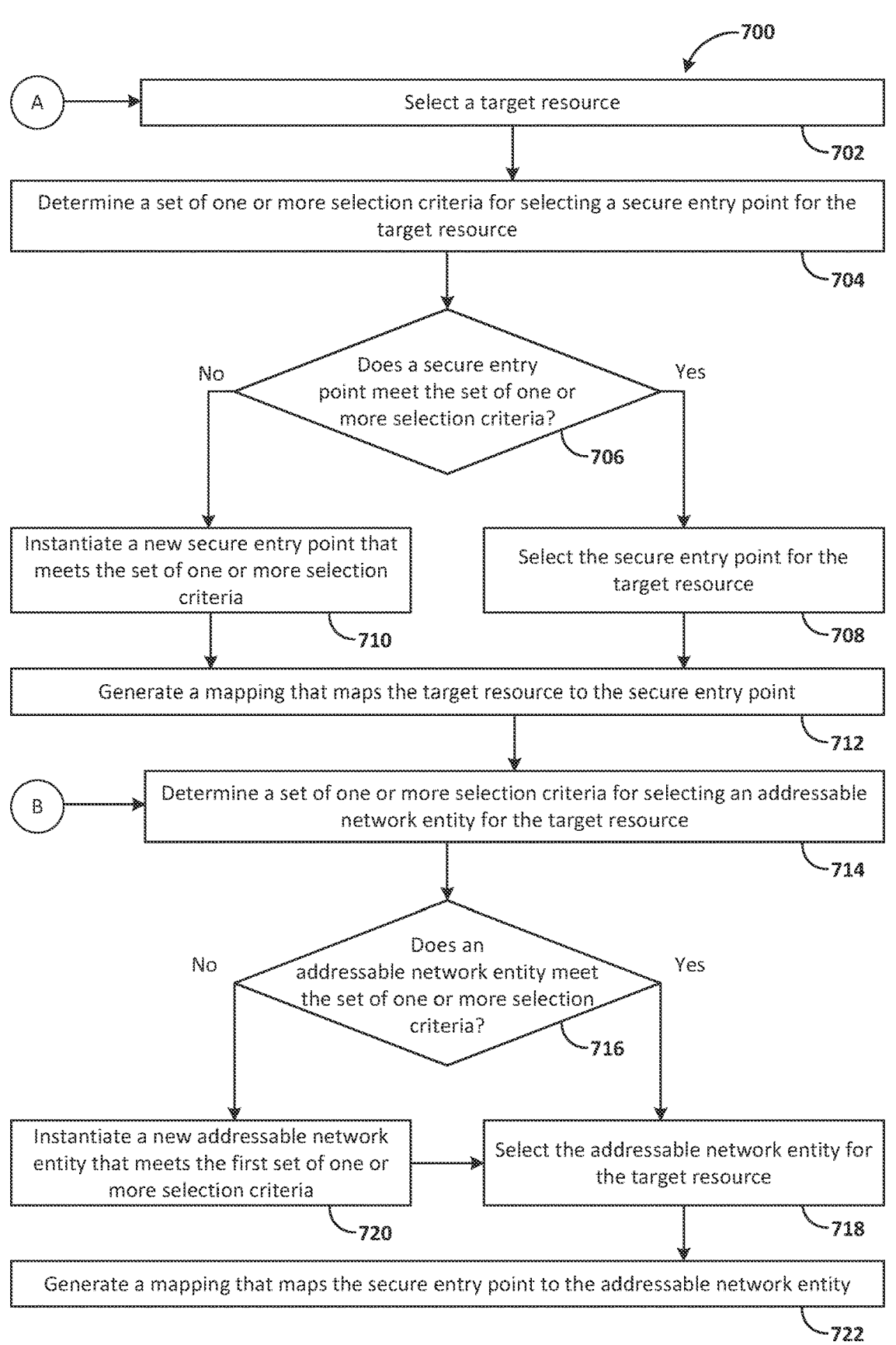
FIGS. 7A-7C, respectively, show flowcharts that illustrate example operations of a system in accordance with one or more embodiments.
Figure 7B:
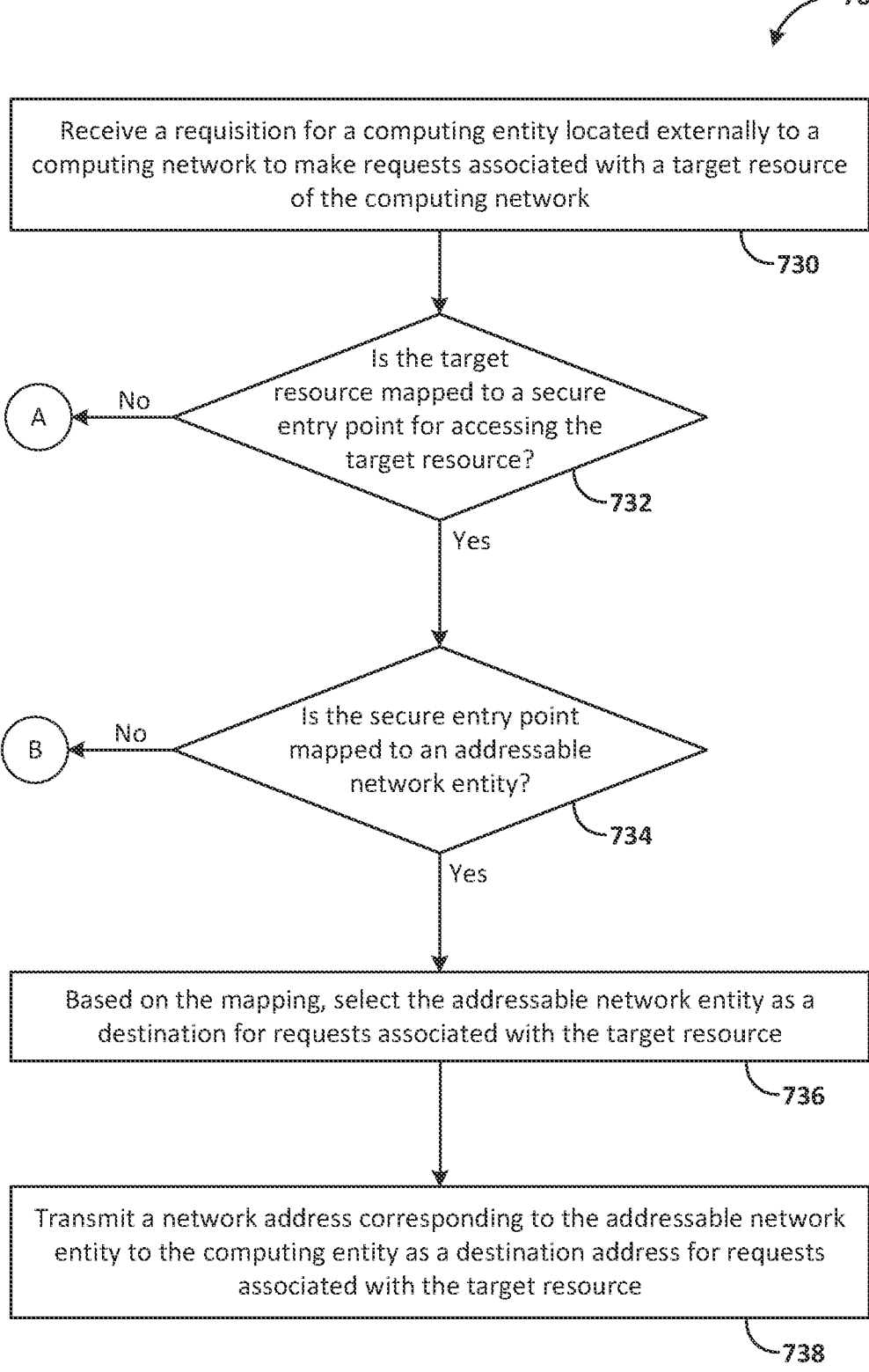
Figure 7C:
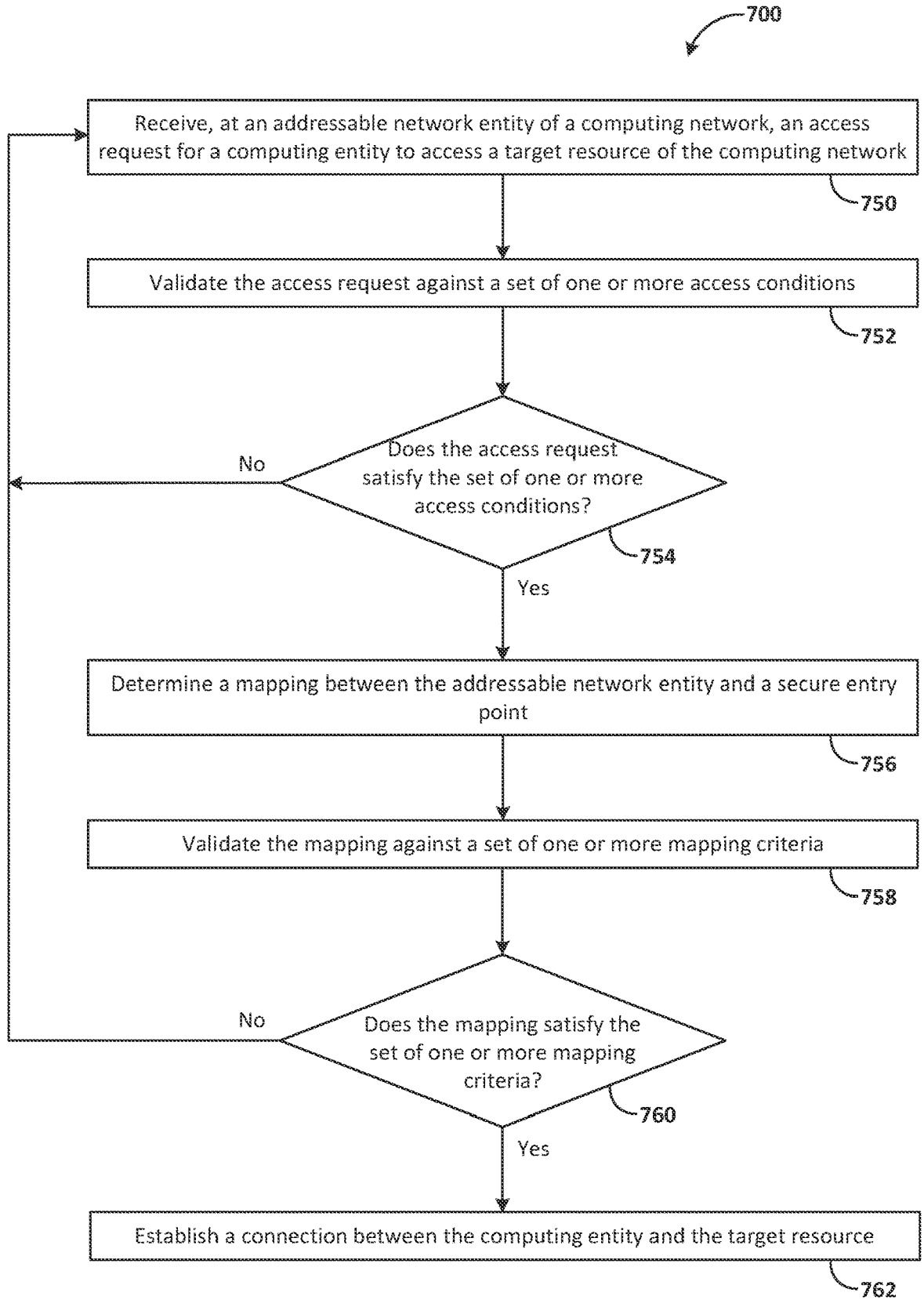

Referring to FIGS. 7A-7C, example operations 700 pertaining to accessing target resources of a virtual cloud network through dedicated secure entry points are further described. One or more operations 700 described with reference to in FIGS. 7A-7C may be modified, combined, rearranged, or omitted. Accordingly, the particular sequence of operations 700 described with reference to FIGS. 7A-7C should not be construed as limiting the scope of one or more embodiments. The operations 700 described with reference to FIG. 7A include operations 700 pertaining to configuring access pathways for accessing target resources. The operations described with reference to FIG. 7B include operations 700 pertaining to providing destination addresses for requests associated with particular target resources. The operations described with reference to FIG. 7C include operations 700 pertaining to validating requests associated with particular target resources. In one example, the operations 700 may be performed by the one or more components of the system described with reference to FIGS. 6A and 6B.

A. Configuring Access Pathways for Accessing Target Resources

Referring to FIG. 7A, operations 700 pertaining to configuring access pathways for accessing target resources are further described. As shown in FIG. 7A, the operations 700 include, at block 702, selecting a target resource. The target resource is selected from a set of target resources. The target resource is selected for configuring an access pathway for secure access to the target resource. The target resource is selected in response to an input from a computing device. In one example, a user associated with a customer that owns the target resource may prompt the system to select the target resource. The user associated with the customer may provide the prompt via a user interface device. Additionally, or alternatively, the target resource is selected for configuring an access pathway for secure access to the target resource in connection with instantiating the target resource on the virtual cloud network. In one example, the target resource is selected through an appropriately configured API endpoint. Additionally, or alternatively, the target resource is selected automatically to configure an access pathway for secure access to the target resource, for example, as part of a process for instantiating the target resource on the virtual cloud network.

At block 704, the operations 700 include determining a set of one or more selection criteria for selecting a secure entry point for the target resource. In one example, the set of one or more selection criteria may be determined through an appropriately configured API endpoint. The selection criteria includes restricted access criteria. The selection criteria may be based on one or more parameters associated with at least one of the following: the particular target resource, a group of target resources, a compartment, a customer, or a computing entity and/or user that may utilize the secure entry point as well as combinations of these. In one example, different secure entry points are associated with different customers, compartments, and/or groups of target resources. Additionally, or alternatively, a particular target resource may be provided a separate secure entry point. Additionally, or alternatively, different secure entry points are provided for different sets of restricted access criteria. In one example, parameters for selecting secure entry points for target resources are defined in configuration settings. The configuration module of the access control service may reference the configuration settings when selecting a secure entry point for a target resource. Additionally, or alternatively, parameters for selecting a secure entry point for a target resource may be included in a request to provision the target resource for secure access.

At block 706, the operations 700 include determining whether a secure entry point meets the set of one or more selection criteria. One or more secure entry points in an access pathway dataset as described with reference to FIGS. 6A and 6B may be evaluated at block 706, for example, to determine whether a secure entry point that is already included in an access pathway meets the set of one or more selection criteria. When a particular secure entry point meets the set of one or more selection criteria, the operations 700 may proceed to block 708. When a particular secure entry point does not meet the set of one or more selection criteria, the operations 700 include determining whether another secure entry point meets the set of one or more selection criteria. When a particular secure entry point that meets the set of one or more selection criteria is identified, the operations 700 may proceed to block 708. When the set of secure entry points do not meet the set of one or more selection criteria, the operations may proceed to block 710.

At block 708, the operations 700 include selecting the secure entry point as a dedicated point of entry for one or more computing entities to securely access the target resource. The secure entry point includes a logical gateway host that is configured to establish a secure connection between an addressable network entity and a target resource. Upon selecting the secure entry point as the dedicated point of entry, the operations may proceed to block 712, where the secure entry point selected as the dedicated point of entry may be mapped to the target resource. When a secure entry point is selected as a dedicated point of entry for a target resource, at block 708, the target resource may be added to an existing access pathway, or a new pathway may be configured that includes the secure entry point and the corresponding target resource.

At block 710, the operations 700 include instantiating a new secure entry point that meets the set of one or more selection criteria. The new secure entry point is selected as a dedicated point of entry for one or more computing entities to securely access the target resource.

In one example, instantiating the new secure entry point includes associating the set of one or more access conditions determined at block 704 with the new secure entry point. In one example, instantiating the new secure entry point includes associating the new secure entry point with a resource identifier that identifies the new secure entry point. Additionally, or alternatively, instantiating the new secure entry point includes generating a mapping of the secure entry point to the target resource associated with the new secure entry point, such as a mapping of the resource identifier corresponding to the target resource to the resource identifier corresponding to the new secure entry point.

Upon instantiating the new secure entry point and selecting the new secure entry point as the dedicated point of entry, the operations may proceed to block 712, where the secure entry point may be mapped to the target resource. When a new secure entry point is instantiated, at block 710, a new pathway may be configured that includes the secure entry point and the corresponding target resource. The new secure entry point is instantiated in a public subnet of the virtual cloud network. In one example, instantiating a new secure entry point includes launching a compute instance that will serve as the secure entry point and assigning a private network address to the secure entry point. Additionally, instantiating the new secure entry point includes configuring authentication keys, access credentials, and/or security groups that are utilized to control traffic to and from the secure entry point.

At block 712, the operations 700 include generating a mapping that maps the target resource to the secure entry point. The mapping of the target resource to the secure entry point includes a mapping of an entity identifier of the secure entry point to a resource identifier of the target resource. In one example, the mapping may be stored in a relational database that includes a column for the target resource and a column for the secure entry point. Additionally, or alternatively, the mapping may be stored as a key-value pair, for example, in a configuration file associated with the secure entry point. Additionally, or alternatively, the mapping may be stored as an object associated with the secure entry point. In one example, the mapping may be generated in a new or existing access pathway in the access pathway dataset.

In one example, at block 712, a first target resource associated with a first set of one or more selection criteria, such as restricted access criteria, may be mapped to a first secure entry point. The first set of selection criteria associated with the first target resource may be determined at block 704. A set of one or more secure entry points are evaluated at block 706 to determine whether a first set of one or more access conditions associated with one of the secure entry points corresponds to the first set of selection criteria. The evaluation at block 706 may return the first secure entry point as being associated with the first set of access conditions corresponding to the first set of selection criteria. The first secure entry point is selected at block 708 responsive to determining that the first set of access conditions corresponds to the first set of selection criteria. Upon having selected the first secure entry point, the first target resource may be mapped to a first secure entry point at block 712.

Additionally, or alternatively, at block 712, a second target resource associated with a second set of one or more selection criteria, such as restricted access criteria, may be mapped to a second secure entry point. The second set of one or more selection criteria may differ from the first set of one or more selection criteria. The second set of selection criteria associated with the second target resource may be determined at block 704. A set of one or more secure entry points are evaluated at block 706 to determine whether a second set of one or more access conditions associated with one of the secure entry points corresponds to the second set of selection criteria. The evaluation at block 706 may return the second secure entry point as being associated with the second set of access conditions corresponding to the second set of selection. The second secure entry point is selected at block 708 responsive to determining that the second set of access conditions corresponds to the second set of selection criteria. Upon having selected the second secure entry point, the second target resource may be mapped to a second secure entry point at block 712.

Additionally, or alternatively, at block 712, a third target resource associated with a third set of one or more selection criteria, such as restricted access criteria, may be mapped to a third secure entry point. The third set of one or more selection criteria may differ from the first set of one or more selection criteria and/or the second set of one or more selection criteria. The third set of selection criteria associated with the third target resource may be determined at block 704. The system may evaluate a set of one or more secure entry points at block 706. As a result of the evaluation, the system determines that the set of one or more secure entry points do not meet the set of one or more selection criteria. In response to determining that the set of one or more secure entry points do not meet the set of one or more selection criteria, a third secure entry point is instantiated at block 710. Upon having instantiated the third secure entry point, the third target resource may be mapped to a third secure entry point at block 712.

At block 714, the operations 700 include determining a set of one or more selection criteria for selecting an addressable network entity for the target resource. The set of one or more selection criteria for selecting an addressable network entity for the target resource may be the same or different from the set of one or more selection criteria for selecting a secure entry point for the target resource. In one example, the set of one or more selection criteria may be determined through an appropriately configured API endpoint. The selection criteria includes restricted access criteria. The selection criteria may be based on one or more parameters associated with at least one of the following: the particular target resource, a group of target resources, a compartment, a customer, or a computing entity and/or user that may utilize the secure entry point as well as combinations of these. In one example, different addressable network entities are associated with different customers, compartments, and/or groups of target resources. Additionally, or alternatively, a particular target resource may be provided a separate addressable network entity. Additionally, or alternatively, different addressable network entities are provided for different sets of restricted access criteria. In one example, parameters for selecting addressable network entities for target resources are defined in configuration settings. The configuration module of the access control service may reference the configuration settings when selecting an addressable network entity for a target resource. Additionally, or alternatively, parameters for selecting an addressable network entity for a target resource may be included in a request to provision the target resource for secure access.

At block 716, the operations 700 include determining whether an addressable network entity meets the set of one or more selection criteria. When a particular addressable network entity meets the set of one or more selection criteria, the operations 700 may proceed to block 718. When a particular addressable network entity does not meet the set of one or more selection criteria, the operations 700 include determining whether another addressable network entity meets the set of one or more selection criteria. When a particular addressable network entity that meets the set of one or more selection criteria is identified, the operations 700 may proceed to block 718. When the set of addressable network entities do not meet the set of one or more selection criteria, the operations may proceed to block 720.

At block 718, the operations 700 include selecting the addressable network entity as a destination for one or more computing entities to access the target resource. The addressable network entity includes a network load balancer. The network load balancer may actively serve requests associated with the corresponding secure entry point. In one example, in addition to selecting an addressable network entity, the operations 700 include selecting a secure entry point, as described with reference to block 708, or instantiating a secure entry point, as described with reference to block 710. Upon selecting the addressable network entity as the destination for the one or more computing entities to access the target resource, the operations may proceed to block 722, where the addressable network entity may be mapped to the secure entry point corresponding to the target resource. Additionally, or alternatively, a secure entry point that is selected as a dedicated point of entry for a target resource may already be mapped to an addressable network entity. When the secure entry point is already mapped to the addressable network entity, the operations may conclude at block 712 (e.g., after generating the mapping of the target resource to the secure entry point). Alternatively, when the secure entry point is already mapped to the addressable network entity, the operations may conclude at block 718 (e.g., after selecting the addressable network entity that is already mapped to the secure entry point based at least on the addressable network entity meeting the set of one or more selection criteria determined at block 714). In one example, provisioning a target resource for secure access by a set of one or more computing entities may at least include selecting a secure entry point for accessing the target resource.

At block 720, the operations 700 include instantiating a new addressable network entity that meets the set of one or more selection criteria. The new addressable network entity is selected as a destination for one or more computing entities to access the target resource. In one example, instantiating the new addressable network entity includes associating the set of one or more access conditions determined at block 714 with the new addressable network entity. In one example, associating the set of one or more access conditions with the new addressable network entity includes configuring a set of one or more access filters to filter requests based on the set of one or more access conditions. In one example, instantiating the new addressable network entity includes associating the new addressable network entity with a resource identifier that identifies the new addressable network entity. Additionally, or alternatively, instantiating the new addressable network entity includes generating a mapping of the new addressable network entity to the target resource associated with the new addressable network entity, such as a mapping of the resource identifier corresponding to the target resource to the resource identifier corresponding to the new addressable network entity.

In one example, in addition to instantiating an addressable network entity, the operations 700 include selecting a secure entry point, as described with reference to block 708, or instantiating a secure entry point, as described with reference to block 710.

Upon instantiating the new addressable network entity and selecting the new addressable network entity as the destination for the one or more computing entities to access the target resource, the operations may proceed to block 722, where the addressable network entity may be mapped to the secure entry point. When a new addressable network entity is instantiated, at block 710, a new pathway may be configured that includes the addressable network entity and the corresponding target resource. The new addressable network entity is instantiated in a public subnet of the virtual cloud network. In one example, instantiating a new addressable network entity includes launching a new instance of a LBaaS that will serve as the secure entry point and assigning a public network address and a private network address to the secure entry point. Additionally, instantiating the new addressable network entity includes configuring authentication keys, access credentials, and/or security groups that may be utilized to control traffic to and from the addressable network entity.

At block 722, the operations 700 include generating a mapping that maps the secure entry point to the addressable network entity. In one example, the mapping of the secure entry point to the addressable network entity includes a mapping of a private network address of the addressable network entity to an entity identifier of the secure entry point. The mapping of the secure entry point to the addressable network entity may be stored together with the mapping of the target resource to the secure entry point. Additionally, or alternatively, the mapping of the secure entry point to the addressable network entity and the mapping of the target resource to the secure entry point may be stored separately from one another. In one example, the mapping of the secure entry point to the addressable network entity may be stored in a relational database that includes a column for the addressable network entity and a column for the secure entry point. Additionally, or alternatively, the mapping may be stored as a key-value pair, for example, in a configuration file associated with the addressable network entity. Additionally, or alternatively, the mapping may be stored as an object associated with the addressable network entity. In one example, the mapping of the secure entry point to the addressable network entity may be generated in a new or existing access pathway in the access pathway dataset.

In one example, at block 722, a first addressable network entity associated with a first set of one or more selection criteria, such as restricted access criteria, may be mapped to a first secure entry point for accessing a first target resource. The first secure entry point is selected at block 708 or instantiated at block 710. The first set of selection criteria associated with the first addressable network entity may be determined at block 714. A set of one or more addressable network entities are evaluated at block 716 to determine whether a first set of one or more access conditions associated with one of the addressable network entities corresponds to the first set of selection criteria. The evaluation at block 716 may return the first addressable network entity as being associated with the first set of access conditions corresponding to the first set of selection criteria. The first addressable network entity is selected at block 718 responsive to determining that the first set of access conditions corresponds to the first set of selection criteria. Upon having selected the first addressable network entity, the first addressable network entity may be mapped to the first secure entry point at block 722.

Additionally, or alternatively, at block 722, a second addressable network entity associated with a second set of one or more selection criteria, such as restricted access criteria, may be mapped to a second secure entry point for accessing a second target resource. The second secure entry point is selected at block 708 or instantiated at block 710. The second set of one or more selection criteria may differ from the first set of one or more selection criteria. The second set of selection criteria associated with the second addressable network entity may be determined at block 714. A set of one or more addressable network entities are evaluated at block 716 to determine whether a second set of one or more access conditions associated with one of the addressable network entities corresponds to the second set of selection criteria. The evaluation at block 716 may return the second addressable network entity as being associated with the second set of access conditions corresponding to the second set of selection criteria. The second addressable network entity is selected at block 718 responsive to determining that the second set of access conditions corresponds to the second set of selection criteria. Upon having selected the second addressable network entity, the second addressable network entity may be mapped to the second secure entry point at block 722.

Additionally, or alternatively, at block 722, a third addressable network entity associated with a third set of one or more selection criteria, such as restricted access criteria, may be mapped to a third secure entry point for accessing a third target resource. The third set of one or more selection criteria may differ from the first set of one or more selection criteria and/or the second set of one or more selection criteria. The third set of selection criteria associated with the third addressable network entity may be determined at block 714. The system may evaluate a set of one or more addressable network entities at block 716. As a result of the evaluation, the system determines that the set of one or more addressable network entities do not meet the set of one or more selection criteria. In response to determining that the set of one or more addressable network entities do not meet the set of one or more selection criteria, a third addressable network entity is instantiated at block 720. Upon having instantiated the third addressable network entity, the third addressable network entity may be mapped to the third secure entry point at block 722.

In one example, target resources are associated with the same customer and different tenants. For example, a first target resource may be associated with a first cloud service provided to a first customer by a first tenant of a cloud provider, and a second target resource may be associated with a second cloud service provided to the first customer by a second tenant of the cloud provider. In one example, the same addressable network entity may be utilized as a destination for requests associated with the first target resource and the second target resource based at least on the first target resource and the second target resource being associated with the same customer. In one example, the same secure entry point may be utilized for the first target resource and the second target resource based at least on the first target resource and the second target resource being associated with the same customer. Additionally, or alternatively, different secure entry points are utilized with respect to the first target resource and the second target resource.

In one example, target resources are associated with the same tenant and different customers. For example, a first target resource may be associated with a first instance of a cloud service provided to a first customer by a first tenant of a cloud provider, and a second target resource may be associated with a second instance of the cloud service provided to a second customer by the first tenant. In one example, different addressable network entities are utilized based at least on the first target resource and the second target resource being associated with different customers. Additionally, or alternatively, different secure entry points are utilized for the first target resource and the second target resource based at least on the first target resource and the second target resource being associated with different customers.

B. Providing Destination Addresses for Requests Associated with Target Resources Referring to FIG. 7B, operations 700 pertaining to providing destination addresses for requests associated with particular target resources are further described. As shown in FIG. 7B, the operations 700 include, at block 730, receiving a requisition for a computing entity to make requests associated with a target resource of a computing network. The requests associated with the target resource includes access requests, such as requests to execute data access operations, transactional operations, batch operations, or streaming operations as well as combinations of these. The requisition may be submitted by cloud operator or a user associated with the cloud operator. The requisition may identify the target resource and the computing entity that may submit the requests associated with the target resource. The requisition may be submitted from the computing entity that may submit the requests associated with the target resource or from a different computing entity than the computing entity that may submit the request. The computing entity that may submit the requests associated with the target resource may be located externally to the computing network or within the computing network. The requisition may be received by an access control service. The request may be processed by a request processing module. The request processing module may validate the requisition. Validating the requisition includes executing one or more authentication operations and/or one or more authorization operation associated with the requisition. The one or more authentication operations include authenticating the computing entity that submitted the requisition, for example, based on a credential accompanying the requisition. The one or more authorization operations include determining whether the computing entity and/or the user that submitted the requisition is authorized to submit the requisition. Additionally, or alternatively, the one or more authorization operations include determining whether the computing entity identified in the requisition is authorized to submit the requests associated with the target resource identified in the requisition. When the system successfully validates the requisition, the operations may proceed to block 732. When the system determines that the requisition is invalid, or when the system is unable to validate the requisition, the system may reject the requisition.

At block 732, the operations 700 include determining whether the target resource is associated with a secure entry point for accessing the target resource. The secure entry point for accessing the target resource may be identified in a data repository, such as in an access pathway dataset as described with reference to FIGS. 6A and 6B. In one example, the secure entry point for accessing the target resource may be identified in an access pathway for accessing the target resource. The secure entry point includes a logical gateway host that is configured to establish a secure connection between the addressable network entity and first target resource. In one example, the target resource is provisioned for secure access by the computing entity identified in the requisition at least by selecting the secure entry point for accessing the target resource. When a secure entry point for accessing the target resource is identified and selected, the operations 700 may proceed to block 734. When the target resource is not associated with a secure entry point and/or when a secure entry point is not identified, the operations 700 may proceed to block 702 (FIG. 7A), where the target resource may be mapped to a secure entry point for accessing the target resource, a new secure entry point is instantiated, and/or an access pathway for accessing the target resource may be configured.

In one example, when the target resource is mapped to a secure entry point, the operations 700 at block 732 include determining whether the secure entry point that is mapped to the target resource meets a set of one or more criteria for the computing entity identified in the requisition to utilize the secure entry point. When the secure entry point meets the set of one or more criteria, the operations 700 may proceed to block 734. When the secure entry point does not meet the set of one or more criteria, the operations 700 may proceed to block 702 (FIG. 7A), where an additional secure entry point for accessing the target resource is instantiated, and/or an access pathway for accessing the target resource may be configured in accordance with the set of one or more criteria.

At block 734, the operations 700 include determining if the secure entry point is mapped to an addressable network entity. A mapping that maps the secure entry point to an addressable network entity may be identified in the data repository, such as in the access pathway dataset as described with reference to FIGS. 6A and 6B. In one example, the mapping of the secure entry point to the addressable network entity may be identified in the access pathways for accessing the target resource identified in the operations 700 described with respect to block 732. The addressable network entity includes a network load balancer. The network load balancer may actively serve requests associated with the corresponding secure entry point. When a mapping that maps the secure entry point to an addressable network entity is identified and selected, the operations 700 may proceed to block 736. When the secure entry point is not mapped to an addressable network entity and/or when a mapping is not identified, the operations 700 may proceed to block 714 (FIG. 7A), where the secure entry point may be mapped to an addressable network entity, a new addressable network entity is instantiated, and/or an access pathway for accessing the target resource may be configured.

In one example, when the secure entry point is mapped to an addressable network entity, the operations 700 at block 732 include determining whether the addressable network entity that is mapped to the secure entry point meets a set of one or more criteria for the computing entity identified in the requisition to utilize the addressable network entity. The set of one or more criteria for utilizing the addressable network entity includes a set of one or more restricted access criteria associated with the target resource. The operation 700 at block 732 includes determining whether a set of one or more access conditions associated with the addressable network entity corresponds to the set of one or more restricted access criteria. When the addressable network entity meets the set of one or more criteria, the operations 700 may proceed to block 736. When the addressable network entity does not meet the set of one or more criteria, the operations 700 may proceed to block 714 (FIG. 7A), where an additional addressable network entity is instantiated and/or an access pathway for accessing the target resource may be configured in accordance with the set of one or more criteria.

At block 736, the operations 700 include selecting the addressable network entity, based on the mapping, as a destination for requests associated with the target resource. In one example, the system may select an access pathway for accessing the target resource from the access pathway dataset that meets the set of one or more selection criteria corresponding to the secure entry point and the addressable network entity identified in the operations 700 described with reference to block 732 and block 734.

At block 738, the operations 700 include transmitting a network address corresponding to the addressable network entity to the computing entity as a destination address for requests associated with the target resource. The system determines the network address of the addressable network entity from the access pathway dataset and/or from metadata associated with the addressable network entity. The network address transmitted to the computing entity may be a public network address that is addressable by the computing entity. A private network address of the addressable network entity is not addressable by the computing entity and is not transmitted to the computing entity. Upon receiving the network address of the addressable network entity, the computing entity may transmit a set of one or more requests associated with the target resource to the network address, and the addressable network entity may forward the respective requests to the secure entry point mapped to the target resource, for example, as described with reference to FIG. 7C.

In one example, different addressable network entities are selected, for example, in response to different requisitions received at block 730 as a destination for requests associated with different target resources. Additionally, or alternatively, different addressable network entities are selected, for example, in response to different requisitions received at block 730 as a destination for requests associated with different computing entities and/or users that may access the respective target resources. Additionally, or alternatively, different addressable network entities are selected, for example, in response to different requisitions received at block 730 as a destination for requests associated with different access criteria, different customers, or different tenants as well as combinations of these.

C. Validating Requests Associated with Target Resources

Referring to FIG. 7C, operations 700 pertaining to validating requests associated with particular target resources are further described. The request includes an access request, such as a request to execute a data access operation, a transactional operation, a batch operation, or a streaming operation as well as combinations of these. As shown in FIG. 7C, the operations 700 include, at block 750, receiving a request associated with a target resource of a computing network. The request includes an access request for a computing entity to access the target resource. The request may be received at an addressable network entity of the computing network. The access request may identify one or more target resources to be accessed and one or more computing entities for accessing the one or more target resources. Additionally, or alternatively, the access request includes a public network address corresponding to an addressable network entity associated with the one or more target resources. The access request may be directed to the public network address. Additionally, or alternatively, the access request includes an entity identifier that identifies a secure entry point associated with the one or more target resources.

At block 752, the operations 700 include validating the access request against a set of one or more access conditions. The system may utilize one or more access filters to validate the set of one or more access conditions. In one example, the set of one or more access conditions includes a condition that a network address identified in an access request corresponds to an addressable network entity of the virtual cloud network. Additionally, or alternatively, the set of one or more access conditions includes a condition that the access request is authorized to be transmitted to the addressable network entity corresponding to the network address identified in the access request. In one example, the set of one or more access conditions includes a condition that a source address of an access request corresponds to a set of one or more authorized source addresses.

Additionally, or alternatively, the access request may be validated based on one or more authentication operations and/or one or more authorization operations. The one or more authentication operations include authenticating a computing entity that submitted the access request, for example, based on a credential accompanying the access request. The one or more authorization operations include determining whether the computing entity and/or the user that submitted the requisition is authorized to submit the access request. Additionally, or alternatively, the one or more authorization operations include determining whether the computing entity identified in the access request is authorized to submit the access request associated with the target resource identified in the access request.

At block 754, the operations 700 include determining whether the access request satisfies the set of one or more access conditions. When the access request satisfies the set of one or more access conditions, the operations may proceed to block 756. When the access request does not satisfy the set of one or more access conditions, the operations may return to block 750, where the operations 700 include receiving another access request. In one example, the system may utilize a request processing module to determine whether the access request satisfies the set of one or more access conditions, for example, based on information obtained from the one or more access filters.

At block 756, the operations 700 include determining a mapping between the addressable network entity and a secure entry point. The mapping between the addressable network entity and the secure entry point may be determined at least by looking up the addressable network entity in a data repository and identifying the secure entry point that is mapped to the addressable network entity in the data repository. The data repository may include an access pathway dataset as described with reference to FIGS. 6A and 6B. The addressable network entity may be identified in the data repository based on a public network address and/or an entity identifier corresponding to the addressable network entity included in the access request. In one example, the mapping between the addressable network entity and the secure entry point may be determined based on an access pathway in the access pathway dataset.

At block 758, the operations 700 include validating the mapping against a set of one or more mapping criteria. The system may validate the mapping against the set of one or more mapping criteria using an appropriately configured API. Validation of the mapping against the set of one or more mapping criteria may be performed to determine whether parameters of the mapping identified at block 756 satisfies the mapping criteria. In one example, mapping criteria includes a condition that the access request include an entity identifier that identifies the secure entry point, and that the secure entry point identified by the entity identifier matches the secure entry point mapped to the addressable network entity. In one example, the system determines a private network address associated with the addressable network entity. The system may determine the private network address based on the entity identifier and/or the public network address corresponding to the addressable network entity. Additionally, or alternatively, the system determines, based on the mapping, that the private network address is an authorized source network address for establishing a connection with the secure entry point. Additionally, or alternatively, the system may validate a mapping between the private network address associated with the addressable network entity and an entity identifier corresponding to the secure entry point. Additionally, or alternatively, the mapping criteria includes a condition that the access request includes a resource identifier that identifies the target resource associated with the access request, and that the target resource identified by the resource identifier matches the target resource mapped to the secure entry point and/or to the addressable network entity. In one example, the system determines an entity identifier associated with the secure entry point, for example, based on the mapping between the addressable network entity and the secure entry point. Additionally, or alternatively, the system determines a resource identifier associated with the target resource, for example, based on the mapping between the secure entry point and the target resource. Additionally, or alternatively, the system may validate the mapping between the entity identifier associated with the secure entry point and the resource identifier corresponding to the secure entry point.

At block 760, the operations 700 include determining whether the mapping satisfies the set of one or more mapping criteria. When the mapping satisfies the set of one or more mapping criteria, the operations may proceed to block 762. When the mapping does not satisfy the set of one or more mapping criteria, the operations may return to block 750, where the operations 700 include receiving another access request. In one example, the system may utilize the request processing module to determine whether the mapping satisfies the set of one or more mapping criteria, for example, based on information obtained from the one or more access filters.

At block 762, the operations 700 include establishing a connection between the computing entity and the target resource. The connection between the computing entity and the target resource may pass through the addressable network entity and the secure entry point mapped to one another and/or to the target resource. The connection includes a secure connection, such as an SSH connection, between the addressable network entity and the target resource. The secure connection may pass through the secure entry point. In one example, establishing the connection between the computing entity and the target resource includes forwarding the access request from the addressable network entity to the secure entry point. The access request may be forwarded to the secure entry point based on an entity identifier corresponding to the secure entry point determined at block 756. Additionally, or alternatively, establishing the connection between the computing entity and the target resource may utilize the private network address of the addressable network entity. Upon having established the connection between the computing entity and the target resource, the computing entity may utilize the connection to access the target resource.

8. MISCELLANEOUS; EXTENSIONS

Embodiments are directed to a system with one or more devices that include a hardware processor and that are configured to perform any of the operations described herein and/or recited in any of the claims below. Embodiments are directed to a system that includes means to perform any of the operations described herein and/or recited in any of the claims below. In an embodiment, a non-transitory computer readable storage medium comprises instructions that, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of patent protection, and what is intended by the applicants to be the scope of patent protection, is the literal and equivalent scope of the set of claims that issue from this application in the specific form that such claims issue, including any subsequent correction.

References, including publications, patent applications, and patents, cited herein are hereby incorporated by reference to the same extent as if each reference were individually and specifically indicated to be incorporated by reference and were set forth in its entirety herein.

What is claimed is:

1. One or more non-transitory computer-readable media storing instructions that, when executed by one or more hardware processors, cause performance of operations comprising:

identifying a first secure entry point for accessing a first target resource of a virtual cloud network, the first secure entry point not being addressable by computing entities outside of the virtual cloud network;

determining a first mapping that maps the first secure entry point to a first addressable network entity of a plurality of addressable network entities that are addressable by the computing entities outside of the virtual cloud network;

based on the first mapping, selecting the first addressable network entity as a first destination for a first set of one or more requests associated with the first target resource;

transmitting to a first computing entity a first network address corresponding to the first addressable network entity as a first destination address for the first set of one or more requests associated with the first target resource;

wherein the first computing entity transmits the first set of one or more requests associated with the first target resource to the first network address corresponding to the first addressable network entity, and wherein the first addressable network entity forwards the first set of one or more requests associated with the first target resource to the first secure entry point.

2. The one or more non-transitory computer-readable media of claim 1, wherein the first network address is a public network address addressable by the first computing entity, and wherein a second network address corresponding to the first secure entry point is private network address that is not addressable by the first computing entity.

3. The one or more non-transitory computer-readable media of claim 1, wherein the first secure entry point comprises a first logical gateway host configured to establish a secure connection between the first addressable network entity and the first target resource.

4. The one or more non-transitory computer-readable media of claim 1, wherein upon satisfying a first set of one or more access conditions associated with the first addressable network entity, the first computing entity utilizes the first network address to accesses the first target resource at least in part through a first secure connection that passes through the first secure entry point.

5. The one or more non-transitory computer-readable media of claim 1, wherein the operations further comprise:

provisioning the first target resource for secure access by a set of one or more computing entities located externally to the virtual cloud network, at least by:

selecting the first secure entry point for accessing the first target resource.

6. The one or more non-transitory computer-readable media of claim 5, wherein provisioning the first target resource for secure access by the set of one or more computing entities further comprises:

determining a first set of one or more restricted access criteria associated with the first target resource;

determining that a first set of one or more access conditions associated with the first addressable network entity corresponds to the first set of one or more restricted access criteria associated with the first target resource;

responsive to determining that the first set of one or more access conditions corresponds to the first set of one or more restricted access criteria:

selecting the first addressable network entity as the first destination for the first set of one or more requests associated with the first target resource.

7. The one or more non-transitory computer-readable media of claim 6, wherein the operations further comprise:

determining a second set of one or more restricted access criteria associated with a second target resource of the virtual cloud network, wherein the second set of one or more restricted access criteria associated with the second target resource differs from the first set of one or more restricted access criteria associated with the first target resource;

determining that a second set of one or more access conditions associated with a second addressable network entity corresponds to the second set of one or more restricted access criteria associated with the second target resource, wherein the second set of one or more access conditions differs from the first set of one or more access conditions;

responsive to determining that the second set of one or more access conditions corresponds to the second set of one or more restricted access criteria:

selecting the second addressable network entity as a second destination for a second set of one or more requests associated with the second target resource, generating a second mapping that maps the second addressable network entity to a second secure entry point for accessing the second target resource, transmitting to a second computing entity a second network address corresponding to the second addressable network entity as a second destination address for the second set of one or more requests associated with the second target resource;

wherein the second computing entity transmits the second set of one or more requests associated with the second target resource to the second network address corresponding to the second addressable network entity, and wherein the second addressable network entity forwards the second set of one or more requests associated with the second target resource to the second secure entry point.

8. The one or more non-transitory computer-readable media of claim 7, wherein the first target resource comprises a first compartment hosted by a first tenant of a cloud operator;

wherein the second target resource comprises a second compartment hosted by the first tenant of the cloud operator;

wherein the first compartment is allocated for a first customer of the first tenant and the second compartment is allocated for a second customer of the first tenant.

9. The one or more non-transitory computer-readable media of claim 6, wherein the operations further comprise:

determining a second set of one or more restricted access criteria associated with a second target resource of the virtual cloud network;

determining that the second set of one or more restricted access criteria associated with the second target resource differs from at least the first set of one or more restricted access criteria associated with the first target resource;

responsive to determining that the second set of one or more restricted access criteria differs from at least the first set of one or more restricted access criteria:

instantiating a second addressable network entity as a second destination for a second set of one or more requests associated with the second target resource, associating a second set of one or more access conditions with the second addressable network entity, wherein the second set of one or more access conditions corresponds to the second set of one or more restricted access criteria, selecting a second secure entry point for accessing the second target resource, generating a second mapping that maps the second secure entry point to the second addressable network entity, transmitting to a second computing entity a second network address corresponding to the second addressable network entity as a second destination address for the second set of one or more requests associated with the second target resource;

wherein the second computing entity transmits the second set of one or more requests associated with the second target resource to the second network address corresponding to the second addressable network entity, and wherein the second addressable network entity forwards the second set of one or more requests associated with the second target resource to the second secure entry point.

10. The one or more non-transitory computer-readable media of claim 9, wherein the operations further comprise:

instantiating the second secure entry point for accessing the second target resource.

11. The one or more non-transitory computer-readable media of claim 10, wherein the operations further comprise:

subsequent to instantiating the second secure entry point for accessing the second target resource comprises:

mapping a resource identifier corresponding to the second target resource to at least one of: the second secure entry point, or the second addressable network entity.

12. The one or more non-transitory computer-readable media of claim 9, wherein generating the second mapping that maps the second secure entry point to the second addressable network entity comprises:

mapping a private network address of the second addressable network entity to an entity identifier corresponding to the second secure entry point.

13. The one or more non-transitory computer-readable media of claim 9, wherein associating the second set of one or more access conditions with the second addressable network entity comprises:

configuring a set of one or more access filters to filter requests based on the second set of one or more access conditions.

14. The one or more non-transitory computer-readable media of claim 13, wherein the set of one or more access filters comprises at least one of:

a first filter configured to validate that the second network address corresponds to the second addressable network entity; or a second filter configured to validate a source addresses corresponding to a request received at the second addressable network entity against a set of one or more authorized source addresses.

15. The one or more non-transitory computer-readable media of claim 1, wherein the operations further comprise:

provisioning a second target resource of the virtual cloud network for secure access by a set of one or more computing entities located externally to the virtual cloud network, at least by:

determining that the first target resource is associated with a first customer of a first tenant of a cloud provider and that the second target resource is associated with a second customer of the first tenant of the cloud provider;

responsive to determining that the first target resource is associated with the first customer and the second target resource is associated with the second customer:

instantiating a second addressable network entity as a second destination for a second set of one or more requests associated with the second target resource, determining a second set of one or more restricted access criteria associated with the second target resource;

associating a second set of one or more access conditions with the second addressable network entity, wherein the second set of one or more access conditions corresponds to the second set of one or more restricted access criteria, instantiating a second secure entry point for accessing the second target resource, generating a second mapping that maps the second secure entry point to the second addressable network entity, transmitting to a second computing entity a second network address corresponding to the second addressable network entity as a second destination address for the second set of one or more requests associated with the second target resource;

wherein the second computing entity transmits the second set of one or more requests associated with the second target resource to the second network address corresponding to the second addressable network entity, and wherein the second addressable network entity forwards the second set of one or more requests associated with the second target resource to the second secure entry point.

16. The one or more non-transitory computer-readable media of claim 1, wherein the operations further comprise:

provisioning a second target resource of the virtual cloud network for secure access by a set of one or more computing entities located externally to the virtual cloud network, at least by:

determining that the first target resource and the second target resource are associated with a first customer;

responsive at least to determining that the first target resource and the second target resource are associated with the first customer:

selecting the first addressable network entity as the first destination for a second set of one or more requests associated with the second target resource, selecting a second secure entry point for accessing the second target resource, generating a second mapping that maps the second secure entry point to the first addressable network entity, and transmitting to a second computing entity the first network address corresponding to the first addressable network entity as the first destination address for the second set of one or more requests associated with the second target resource;

wherein the second computing entity transmits the second set of one or more requests associated with the second target resource to the first network address corresponding to the first addressable network entity, and wherein the first addressable network entity forwards the second set of one or more requests associated with the second target resource to the second secure entry point.

17. The one or more non-transitory computer-readable media of claim 16, wherein the operations further comprise:

determining that the first target resource is associated with a first cloud service provided to the first customer by a first tenant of a cloud provider;

determining that the second target resource is associated with a second cloud service provided to the first customer by a second tenant of the cloud provider;

wherein selecting the first addressable network entity as the first destination for the second set of one or more requests associated with the second target resource and selecting the second secure entry point for accessing the second target resource are further responsive to determining that the first target resource is associated with the first cloud service provided to the first customer by the first tenant and that the second target resource is associated with the second cloud service provided to the first customer by the second tenant.

18. The one or more non-transitory computer-readable media of claim 1, wherein prior to forwarding a first request to the first secure entry point, the first addressable network entity determines the first secure entry point based at least in part on the first mapping.

19. A method, comprising:

identifying a first secure entry point for accessing a first target resource of a virtual cloud network, the first secure entry point not being addressable by computing entities outside of the virtual cloud network;

determining a first mapping that maps the first secure entry point to a first addressable network entity of a plurality of addressable network entities that are addressable by the computing entities outside of the virtual cloud network;

based on the first mapping, selecting the first addressable network entity as a first destination for a first set of one or more requests associated with the first target resource;

transmitting to a first computing entity a first network address corresponding to the first addressable network entity as a first destination address for the first set of one or more requests associated with the first target resource;

wherein the first computing entity transmits the first set of one or more requests associated with the first target resource to the first network address corresponding to the first addressable network entity, and wherein the first addressable network entity forwards the first set of one or more requests associated with the first target resource to the first secure entry point;

wherein the method is performed by at least one device including a hardware processor.

20. A system, comprising:

at least one hardware processor;

wherein the system is configured to execute operations, using the at least one hardware processor, the operations comprising:

identifying a first secure entry point for accessing a first target resource of a virtual cloud network, the first secure entry point not being addressable by computing entities outside of the virtual cloud network;

determining a first mapping that maps the first secure entry point to a first addressable network entity of a plurality of addressable network entities that are addressable by the computing entities outside of the virtual cloud network;

based on the first mapping, selecting the first addressable network entity as a first destination for a first set of one or more requests associated with the first target resource;

transmitting to a first computing entity a first network address corresponding to the first addressable network entity as a first destination address for the first set of one or more requests associated with the first target resource;

wherein the first computing entity transmits the first set of one or more requests associated with the first target resource to the first network address corresponding to the first addressable network entity, and wherein the first addressable network entity forwards the first set of one or more requests associated with the first target resource to the first secure entry point.

* * * * *